United States Patent
Wilson et al.

(10) Patent No.: US 9,560,109 B2
(45) Date of Patent: Jan. 31, 2017

(54) MESSAGE MANAGEMENT FACILITY FOR AN INDUSTRIAL PROCESS CONTROL ENVIRONMENT

(71) Applicant: Invensys Systems, Inc., Foxboro, MA (US)

(72) Inventors: Irvine William Wilson, Meerbusch (DE); Markus Stephan Paul, Schorndorf (DE); Ewald Gerhard Weiss, Bondorf (DE)

(73) Assignee: Invensys Systems, Inc., Foxboro, MA (US)

( * ) Notice: Subject to any disclaimer, the term of this patent is extended or adjusted under 35 U.S.C. 154(b) by 532 days.

(21) Appl. No.: 13/932,680

(22) Filed: Jul. 1, 2013

(65) Prior Publication Data

US 2013/0297748 A1 Nov. 7, 2013

Related U.S. Application Data

(63) Continuation of application No. 10/998,202, filed on Nov. 26, 2004, now abandoned.

(51) Int. Cl.
*G06F 15/16* (2006.01)
*H04L 29/08* (2006.01)
(Continued)

(52) U.S. Cl.
CPC ........... *H04L 67/02* (2013.01); *G05B 19/4184* (2013.01); *G05B 23/027* (2013.01); *G06F 9/546* (2013.01);
(Continued)

(58) Field of Classification Search
CPC .......... H04L 67/02; H04L 43/08; H04L 45/00; H04L 47/10; G05B 19/4184; G05B 23/027; G06F 9/546
See application file for complete search history.

(56) References Cited

U.S. PATENT DOCUMENTS

| | | | |
|---|---|---|---|
| 6,353,385 B1* | 3/2002 | Molini | G08B 25/00 340/502 |
| 6,404,743 B1* | 6/2002 | Meandzija | H04Q 3/0095 370/254 |

(Continued)

*Primary Examiner* — John MacIlwinen
(74) *Attorney, Agent, or Firm* — Stephen Manetta; Ralph Graham

(57) ABSTRACT

A message management facility is described herein that is hosted by a networked node, in a process control network environment, that is separate from a control processor. The message management facility routes a stream of messages received from the control processor to a set of destinations on a supervisory network. By interposing the message management facility on a node that is interposed, in a message steam, between alarm message sources (control processors) and alarm message sinks (workstations, printers, historians), a number of additional functions can be implemented to carry out a number of advanced functions. Examples of such functions include: table-based routing of a single alarm to a number of destinations on an application network, suppressing alarm showers by applying a criterion to received messages when shower conditions have been sensed, invoking commands based upon a configured category assigned to particular identified messages prior to delivery of the message to its final destination, and invoking actions in response to event/mode status changes (including re-prioritizing alarms).

17 Claims, 14 Drawing Sheets

(51) Int. Cl.
*G05B 19/418* (2006.01)
*G05B 23/02* (2006.01)
*G06F 9/54* (2006.01)
*H04L 12/18* (2006.01)
*H04L 12/701* (2013.01)
*H04L 12/26* (2006.01)
*H04L 12/801* (2013.01)

(52) U.S. Cl.
CPC ........... *H04L 12/1895* (2013.01); *H04L 43/08* (2013.01); *H04L 45/00* (2013.01); *G05B 2219/31438* (2013.01); *H04L 47/10* (2013.01); *Y02P 90/14* (2015.11); *Y02P 90/18* (2015.11)

(56) References Cited

U.S. PATENT DOCUMENTS

| | | | | |
|---|---|---|---|---|
| 8,041,799 | B1* | 10/2011 | Usery | H04Q 3/0075 709/223 |
| 2002/0178275 | A1* | 11/2002 | Hein | G06F 19/3418 709/231 |
| 2004/0103178 | A1* | 5/2004 | O'Hara | G06F 9/45512 709/223 |
| 2005/0231349 | A1* | 10/2005 | Bhat | G08B 3/10 340/506 |
| 2005/0265308 | A1* | 12/2005 | Barbir | H04L 12/4641 370/351 |

* cited by examiner

FIG. 8

| | Compound | Block | Alarm Type | Action TriggerTable | Command Category Id | Alias |
|---|---|---|---|---|---|---|
| 878 | REACTOR4 | ZOL633 | HIDEV | USE-Z | | Positive deviation of value in REACTOR4:ZOL633 too large |
| 879 | REACTOR4 | ZOL712 | HIABS | USE-Z | | Absolute value in REACTOR4:ZOL712 too high |
| 880 | REACTOR4 | ZOL714 | HHABS | USE-Y | | Absolute value in REACTOR4:ZOL714 too high |
| 881 | REACTOR4 | ZOL732 | HHABS | USE-Z | | Absolute value in REACTOR4:ZOL732 extremely too high |
| 882 | REACTOR4 | ZOL734 | STATE | GROUP2 | | Bed state in REACTOR4:ZOL734 |
| 883 | REACTOR4 | ZOL768 | HIDEV | USE-X | | Positive deviation of value in REACTOR4:ZOL768 too large |
| 884 | REACTOR4 | ZOL846 | LODEV | USE-Y | | Negative deviation of value in REACTOR4:ZOL846 too large |
| 885 | REACTOR4 | ZOL909 | LOABS | C-CLASS | | Absolute value in REACTOR4:ZOL909 too low |
| 886 | TANKX | AXF172 | LLABS | A-CLASS | | Absolute value in TANKX:AXF172 extremely too low |
| 887 | TANKX | AXF209 | LODEV | C-CLASS | | Negative deviation of value in TANKX:AXF209 too large |
| 888 | TANKX | AXF280 | HIDEV | USE-Z | | Positive deviation of value in TANKX:AXF280 too large |
| 889 | TANKX | AXF48 | STATE | B-CLASS | | Bed state in TANKX:AXF48 |
| 890 | TANKX | AXF51 | LOABS | A-CLASS | | Absolute value in TANKX:AXF51 too low |
| 891 | TANKX | AXF543 | LODEV | B-CLASS | | Negative deviation of value in TANKX:AXF543 too large |
| 892 | TANKX | AXF599 | LOABS | USE-Y | | Absolute value in TANKX:AXF599 too low |
| 893 | TANKX | AXF713 | LOABS | USE-X | | Absolute value in TANKX:AXF713 too low |
| 894 | TANKX | AXF755 | HIDEV | B-CLASS | | Positive deviation of value in TANKX:AXF755 too large |
| 895 | TANKX | BZY157 | LOABS | USE-X | | Absolute value in TANKX:BZY157 too low |
| 896 | TANKX | BZY264 | STATE | USE-X | | Bed state in TANKX:BZY264 |
| 897 | TANKX | BZY387 | HHABS | USE-Z | | Absolute value in TANKX:BZY387 extremely too high |
| 898 | TANKX | BZY499 | LLABS | USE-Y | | Absolute value in TANKX:BZY499 extremely too low |
| 899 | TANKX | BZY534 | LOABS | USE-Z | | Absolute value in TANKX:BZY534 too low |
| 900 | TANKX | BZY587 | HHABS | USE-X | | Absolute value in TANKX:BZY587 extremely too high |
| 901 | TANKX | BZY646 | HHABS | B-CLASS | | Absolute value in TANKX:BZY646 extremely too high |
| 902 | TANKX | BZY686 | HIDEV | USE-X | | Positive deviation of value in TANKX:BZY686 too large |
| 903 | TANKX | BZY705 | LLABS | USE-Y | | Absolute value in TANKX:BZY705 extremely too low |
| 904 | TANKX | BZY784 | HIABS | GROUP1 | | Absolute value in TANKX:BZY784 too high |
| 905 | TANKX | CAX123 | LOABS | A-CLASS | | Absolute value in TANKX:CAX123 too low |
| 906 | TANKX | CAX178 | HIDEV | GROUP1 | | Positive deviation of value in TANKX:CAX178 too large |
| 907 | TANKX | CAX22 | LOABS | C-CLASS | | Absolute value in TANKX:CAX22 too low |

MESSAGE MANAGEMENT FACILITY FOR AN INDUSTRIAL PROCESS CONTROL ENVIRONMENT

CROSS REFERENCE TO RELATED APPLICATION

This application is a continuation application of and claims priority to U.S. application Ser. No. 10/998,202, entitled MESSAGE MANAGEMENT FACILITY FOR AN INDUSTRIAL PROCESS CONTROL ENVIRONMENT, filed Nov. 26, 2004, the contents of which are incorporated herein by reference in their entirety for all purposes.

FIELD OF THE INVENTION

The present invention generally relates to the field of networked computerized process control systems. More particularly, the present invention relates to supervisory process control and manufacturing information systems. Such systems generally execute above a control layer in a process control system to provide guidance to lower level control elements such as, by way of example, programmable logic controllers.

BACKGROUND

Industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms. By way of example the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as move equipment into and out of service as required.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. When multiplied by thousands of sensors/control elements, this results in so much data flowing into the process control system that sophisticated data management and process visualization techniques are required.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a human machine interface. Such data includes mode changes, events, and alarm messages rendered by process controllers in response to a variety of detected process conditions/circumstances.

Process alarm messages are traditionally sent from plant control processors to alarm displays on workstations to notify operators of plant upsets. Generally, alarm messages are issued by control processors when a measured or calculated value is rendered outside a pre-configured range. The plant controller transmits the generated alarm to one or more operator workstations coupled to a separate (e.g., application) network. Detection, generation and transmission of alarms can potentially place a heavy load on a controller.

Known process control systems support a variety of alarm ordering techniques including assigning alarm priorities and filtering alarm messages according any of a variety of characteristics. The alarm prioritization/filtering functionality carried out by the control processor assists operators in assessing plant/process status and facilitates expedited correction of problems as they arise in a plant process. In general, the alarm priorities are relatively fixed and are changed through human intervention. Prioritizing alarms/messages alone will not avoid overwhelming an operator with a shower of alarm messages during a major plant failure or succession of cascading process/plant component failures. Overlooking a particular alarm or class of alarms, during an alarm shower can lead to harm to both humans and the plant itself.

SUMMARY OF THE INVENTION

The present invention provides a method and facility for managing messages, for example alarms, that pass from control processors to a variety of destinations (e.g., workstations, printers, historians/databases) associated with supervisory control of an industrial process. Managing messages is carried out by interposing appropriate management functionality between sources of messages (e.g., control processors) and the message's final destinations. Such arrangement facilitates executing a variety of functions on the message stream.

More particularly, a message management facility routes a stream of messages received from the control processor to a set of supervisory destinations. The facility includes a message receiver for receiving a message including a message group ID field. The facility also includes message routing information comprising a set of message routing entries. Each of such routing entries includes a message group ID value, and a set of message routing destinations for received messages specifying the message group ID. The facility also includes a destination server for transmitting the message received by the message receiver to one or more network destinations based on an ID specified in the message group ID field and a set of message routing destinations specified in a corresponding routing entry of the message routing information.

The facility also carries out a message monitor role wherein the facility monitors a stream of messages received from a control processor and initiates executing a command in response to detecting particular identified messages in the stream of messages. In this regard, the message monitor includes a message table including a set of message table entries. Each entry comprises a message ID and a command ID. A message receiver of the facility includes a message monitoring functionality for receiving a message including a message ID value, and identifying a categorized message by locating an entry in the message table corresponding to the received message. Finally, a command execution functionality initiates executing a command associated with the command ID, of the entry in the message table for the categorized message, in association with the message receiver identifying the categorized message.

The facility also carries out a status message monitor roles wherein the facility initiates executing a command in response to detecting status changes contained within messages in the stream of messages. In this regard, the message monitor includes a message receiver including a message monitoring functionality for identifying status changes relating to modes/events specified in a received message. The facility also initiates executing actions in accordance with a current mode/events status in view of the received message. The actions comprise, for example, setting a new priority for an alarm.

In yet another role, the facility monitors the volume of messages passing over a period of time, and in response to detecting a message (e.g., alarm shower) the facility operates to restrict messages passed to intended destinations by applying a suppression criterion on the steam of messages. For example, when a shower is detected, messages/alarms that do not meet a message priority threshold are discarded by the facility. Other criterions are contemplated in alternative embodiments of the invention.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 8 is an exemplary graphical user interface for configuring contents of a message table;

FIG. 12 is an exemplary graphical user interface for configuring matrices corresponding to the action category IDs referenced in the action trigger table;

FIG. 13 is an exemplary graphical user interface for configuring parameter actions specifying particular parameter/value combinations associated with a particular parameter action ID potentially listed in a cell within a matrix of a set of matrices making up the action categories;

DETAILED DESCRIPTION

Figure 1:
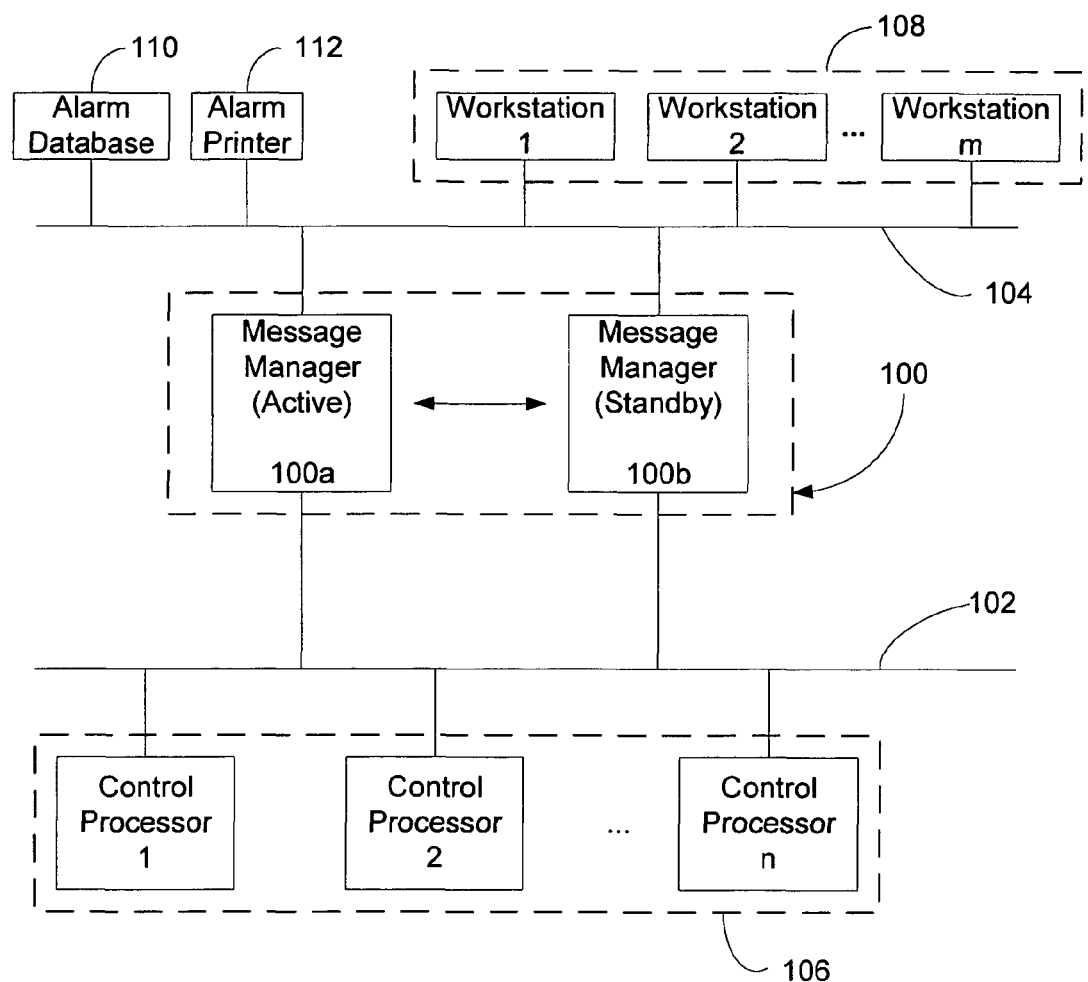
FIG. 1 is schematic network diagram showing an exemplary process control environment comprising both a control network and an application/supervisory network suitable for carrying out an embodiment of the present invention.

Structural and functional features of exemplary embodiments of the present invention are described herein with regard to configuration and runtime aspects of a message management facility. At runtime, the functionality of transmitting ("routing") alarm messages, from control processors residing on a control network to one or more operator workstations (or other nodes) residing on an application network, has been extracted from the control processors and placed in one or more message management components executing on nodes coupled to a control network that hosts the control processors. The message management nodes are coupled to both the control network and the application network. Detecting and generating alarms takes place in the control processors (as before). Placing alarm routing functionality in a workstation or other node coupled to the application network reduces the computational and memory load on the control processor. Furthermore, placing routing functionality in a separate (e.g., application workstation) node facilitates supplementing base routing functionality with enhanced alarm message handling capabilities.

For example, in addition to routing alarm messages, a workstation configured to receive/route messages issued by control processors on a control network also monitors alarm flow. While monitoring alarm flow, a workstation applies previously configured policies to particular alarm messages. In response to detecting an identified alarm in a received message, the message management facility invokes particular actions/functions/programs on a workstation. To this end a configurator application and user interface enables a user to design/customize the message management facility to invoke a program upon detecting a pre-configured alarm being routed to a destination. The invoked program can perform any of a variety of functions including, by way of example, issuing a voice message (stored as an MP3 or WAV file), sending an email message, or generating output to a printer, historian, etc. The responses are created, identified, and stored in command databases that are customized via the configurator application.

Another feature incorporated into the message management facility described herein is automatic reprioritization of alarms in response to events and operation mode transitions. In the exemplary embodiment the message management facility dynamically updates (and modifies if necessary) alarm priorities based upon changes to a current status of the process control system. The status is defined, by way of example by a mode and/or event(s). During configuration, dynamically assignable priorities of a particular alarm (or alternatively a class/group of alarms) are defined, for example, in a matrix comprising mutually exclusive modes and non-mutually exclusive events. For each mode/event combination within the matrix, an alarm priority is potentially specified for the alarm. The message management facility responds to events and mode transitions by looking up a potentially new priority for each alarm for which priorities are potentially dynamically re-assigned. In an exemplary embodiment, mode transitions and/or events are defined/associated with simple state alarms. The state alarms are, for example, hard wired to key switches. The state alarms are also potentially soft alarms generated within the process control system based upon certain sensed plant conditions or control logic output.

In accordance with yet another feature of the exemplary message management facility, an alarm shower suppression functionality counts alarms flowing per time slice to detect a potentially overwhelming quantity of alarms. It compares the count value in the time slice to a pre-configured limit. If the limit is exceeded, then an alarm shower state is entered and alarms having a priority lower than a pre-configured priority are not passed on to a destination workstation and are thus suppressed until a subsequent count of alarms over a period of time falls to a point where the alarm shower state can be exited. Thus, during an alarm "shower" only the most important/critical alarms are forwarded to an intended workstation. In this way, the most important/critical alarms will not be masked or delayed by lower priority alarms.

Turning to an exemplary runtime arrangement depicted in FIG. 1, a message management facility 100 executes as an application on one or more specially configured nodes having physical network interfaces supporting connections to nodes on both a control network 102 and an application network 104. Such networks are implemented, by way of example, according to the ETHERNET standard local area network protocols. The connections over the networks 102 and 104 are implemented by any of a variety of forms through separate network communications services executing on the same network node(s) as the message management facility 100. It is further noted that while a single active message manager handles all messages in the illustratively depicted arrangement in FIG. 1, the message management functionality can be carried out by multiple active message managers running on separate nodes, coupled to the control network 102 and application network 104, and handling particular identified/specified ones of the alarms generated by control processors on the control network 102.

The message management facility 100 carries out a variety of functions. Such functions include, by way of example, receiving messages including mode changes, events, and alarms from message delivery services running on nodes on the control network 102; modifying the messages (e.g., adding an alias to a message); and dispatching alarm messages to designated destinations (e.g., alarm management subsystems on operator workstations, alarm logs/databases, alarm printers, etc.). In the case of an alarm management subsystem, the alarm messages drive graphical user interface displays and alarm annunciation components that generate an audible/verbal alarm message. In addition to passing alarm messages to designated destinations, the message management facility 100 is capable of: dynamically adjusting alarm priorities in response to messages identifying sensed events and operation mode (e.g., standby, startup, run, etc.) transitions; invoking a command (performed either locally or on another node coupled to the application network 104) in response to a particular received alarm message; and commencing an action resulting in issuance of an audible (e.g., verbal) message based upon a particular received alarm message.

In the illustrative example, the message management facility 100 is presented in a redundant form including an active message manager 100a and a standby message manager 100b. The redundancy can be implemented in any of a variety of ways in accordance with various embodiments of the invention. In an exemplary embodiment, the redundant message managers 100a and 100b synchronize and monitor status of their redundant partners by communications transmitted via the control network 102. However, in alternative embodiments synchronization is carried out via the application network 104 or even a third physical network (requiring a third network interface for each of the redundant message managers 100a and 100b). In the event the currently active partner fails, the standby message manager automatically takes on the active role previously held by the failed partner.

Each of the message managers 100a and 100b of the message management facility 100 are associated with network connections to one or more of a set of N control processors 106 on the control network 102. The control processors 106, by way of example, execute a variety of automated distributed process control programs (loops), carried out in the form of compounds and blocks, that facilitate receiving data from sensors/devices deployed in a plant, analyzing the received data in view of current set points, and issuing control commands to actuators on plant equipment. The set points are provided, for example, by automated supervisory process control programs as well as human input via the application network 104. While not shown in the drawing, the control processors 106 are communicatively coupled to one or more sub-networks that host communications between the control processors 106 and sources of field data. The sub-networks include, for example, a plurality of field communication modules. The field communication modules, in turn, comprise a portion of a field device sub-network/bus including various sensors and actuators that facilitate automated control of a industrial/plant process.

The active and standby message managers 100a and 100b, by way of example, receive alarm messages issued by a message delivery server (MDS) executing on each of the control processors 106. Both active and standby message managers 100a and 100b process messages received from the control processors 106 concurrently. However, as explained further herein below, processing alarm messages on the standby message manager 100b does not include issuing messages to devices configured in the message manager's device database.

The message management facility 100 establishes connections to one or more of a set of operator workstations on the application network 104. In the illustrative redundant message manager configuration depicted in FIG. 1, only the active partner of the redundant message managers 100a and 100b establishes connections to the devices on the application network 104. Thereafter, the active partner of the message management facility 100 forwards/routes the received messages to a variety of destinations on the application network 104, and if specified in a set of message management tasks, invoking an operation. The destinations to which the alarms are forwarded by the message management facility 100 include, by way of example, an alarm management subsystem executing on one of a set of M operator workstations 108, an alarm printer 112, an alarm database/historian 110, etc.

Having described an exemplary runtime environment including the message management facility 100, it is noted that in alternative embodiments, the message management facility 100 is carried out in alternative network topologies. For example, in a minimal network environment, the node executing the message management facility 100 incorporates the functionality of other nodes of the application network 104. For example, the alarm database and workstation functionality is incorporated into a node connected to the control network 102 that also runs the message manager 100b. In yet other embodiments, multiple instances of the message management facility 100 are provided to share message management responsibilities for a set of devices coupled to the application network 104. Still other embodiments will be contemplated by those skilled in the art in view of the disclosed embodiments described herein.

Figure 2:
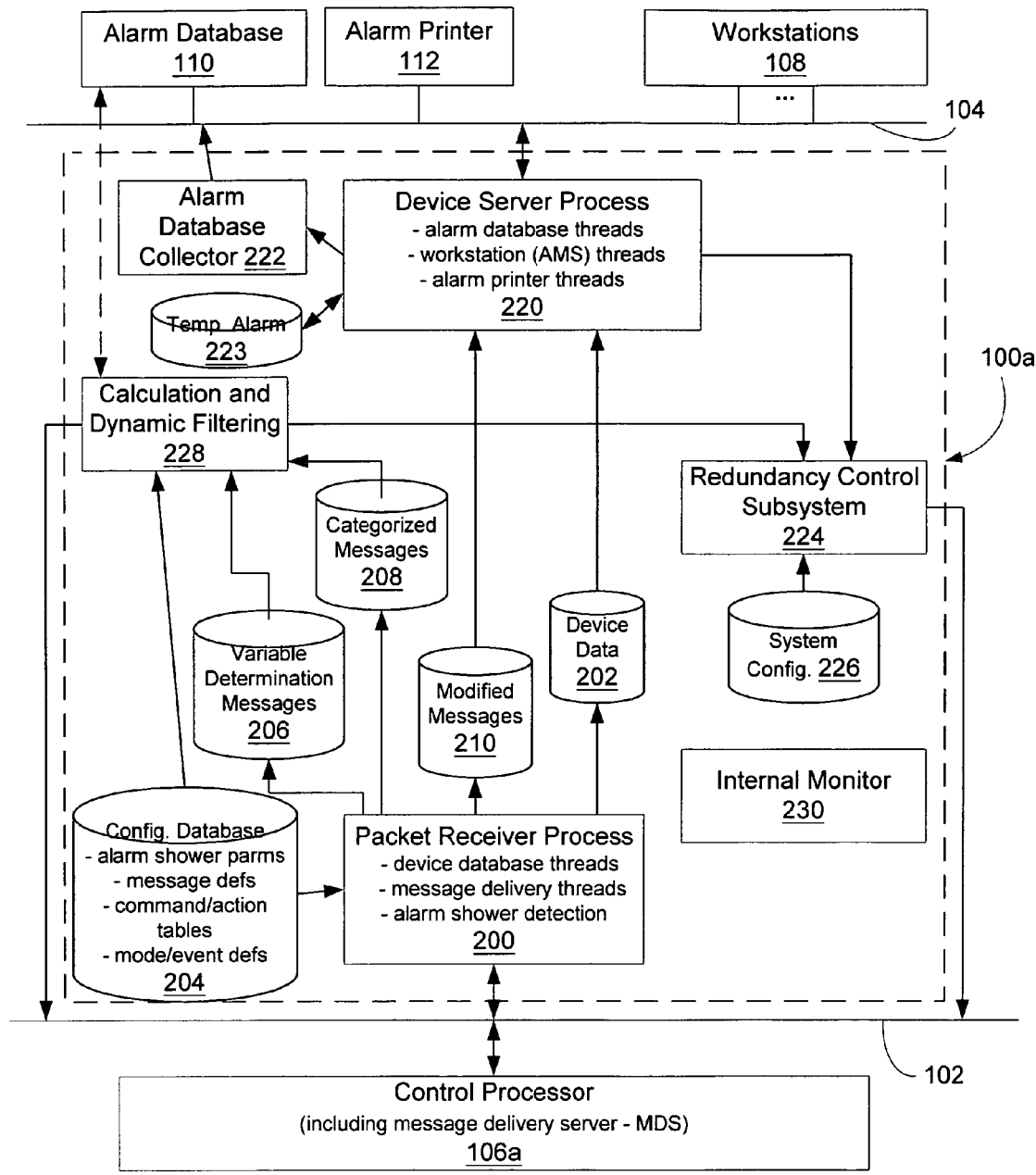
FIG. 2 is a schematic diagram of a message management facility incorporated into a node comprising interfaces to both the control network and application/supervisory network.

Having described a general runtime arrangement of a process control environment including the (redundant) message management facility 100, attention is directed to FIG. 2, that depicts a set of functional components of, and data flow within, the message manager 100a that operates to process messages received from the control processors 106 on the control network 102. A packet receiver process 200 on the message manager 100a, comprising device database threads and message delivery server threads (one thread per control processor message delivery server to which the packet receiver 200 connects), receives and unpacks message packets, containing potentially many messages to reduce overhead, issued by the message delivery server (MDS) running on each control processor 106x (including control processor 106a or any other source of message packets) on the control network.

A configuration database 204 contains configuration information, extracted from a configuration (see FIG. 3 below) defined via a message management facility configurator (described further herein below), that governs the runtime operation of the message manager 100a. The configuration database 204, by way of example, contains: a Table of Message Attributes, Table of Category (command/ action) Attributes, Matrix and Variable Definition, and Alarm Shower Parameters.

The following describes an exemplary set/sequence of operations supported by an exemplary messaging interface between the message manager 100a and a message delivery server (MDS) on the control processor 106a. Initially, at startup, the message manager 100a uses inter-process communication services to initialize a connection between a dedicated message delivery server thread within the packet receiver process 200 and the MDS running on the control processor 106a. After initializing the connection, the message manager 100a issues a START_SESSION message to the MDS to register the control processor 106a and waits for a START_SESSION_REPLY message from the MDS.

After sending a START_SESSION_REPLY message, the MDS sends message group device definitions to a corresponding dedicated MDS thread of the packet receiver 200. The group device definitions include device information from connected MDS's on the set of control processors 106. The device information, maintained in a device database 202, indicates which devices (e.g., workstations, printers, alarm databases on the application network 104) receive certain identified messages. The device information is, in effect, the routing information (destinations) for subsequently received messages. The packet receiver 200 stores the extracted device (message routing) information in the device database 202.

In an exemplary embodiment, the device database 202 holds a set of group device definition entries. Each entry contains, by way of example, the following fields:
  String, consisting of a concatenated MDS ID and Message Group ID. The String is used as a search key into the device database 202.
  Array, comprising up to 32 device names
  Number, identifying the quantity of defined devices specified in the Array.

The device database 202 is also capable of being updated during normal runtime of the message manager. In this case, the MDS sends a message to the message manager specifying new message destination information. The packet receiver 200 recognizes the type of message and updates the appropriately keyed entry within device database 202 accordingly. A device server process 220, described herein below, is notified when updated to the device database 202 occur in view of the possibility that a new threads may needed or old threads terminated in view of the device database 202 update.

During initialization and in response to update requests from alarm management subsystems (AMSs) on the workstations 108, the MDS threads of the message manager 100a obtain current status information by sending a CURRENT_ STATE_REQUEST to the MDS on the control processor 106a. In response the MDS returns message packets containing current alarm and contact input (CIN) states, which are associated with mode and event variables, present on the control processor 106a as MESSAGE_DATA messages. The responses from the MDS also include any MESSAGE_ DATA messages buffered by the MDS on the control processor 106a before initialization operations. The message manager 100a acknowledges each packet with a RECEIPT_ CONFIRMATION message. The current state data transfer/ acknowledgement cycles are repeated until a CURRENT_ STATE_END message is received by the message manager.

During the normal operation mode of the message manager 100a, the packet receiver 200 issues a MESSAGE_ MAINTENANCE_REQUEST to the MDS and waits for the MDS to issue a MESSAGE_MAINTENANCE_REPLY message. All messages are transmitted by the MDS in the form of MESSAGE_DATA messages within message packets, and the message manager 100a acknowledges each packet by transmitting a RECEIPT_CONFIRMATION message to the MDS on the control processor 106a.

The packet receiver 200, extracts messages from the MESSAGE_DATA message packets and places the messages into one of: a variable determination messages queue 206, a categorized messages queue 208, a modified messages queue 210, and the device database 202.

While operating in this normal mode, the packet receiver 200 executes alarm shower detection according to a set of alarm shower parameters provided by a configuration database 204. In the illustrative embodiment, alarm shower detection is characterized by a specified number of alarms received within a time period and an alarm priority value. The alarm priority value establishes a priority threshold for alarms passed to devices, such as the workstations 108 on the application network 104, in the event that an alarm shower is detected. Alarms having insufficiently high priority are discarded by the packet receiver 200. Configuring alarm shower behavior for the message management facility 100, including the message manager 100*a* is described further herein below.

It is noted that the standby message manager 100*b*, though assigned a passive role in forwarding alarm messages to devices, also registers/initializes with the same MDSs as the active message manager 100*a* to ensure that all messages are received by both of the redundant message managers.

Finally, in the event that the message manager 100*a* detects a connection failure, the message manager 100*a*, after the cause of the failure has be eliminated, attempts to re-establish the connection to the MDS on the control processor 106*a*. If an initial attempt fails, further attempts are initiated every second.

The messages received by the packet receiver 200 are parsed and stored, after potential modification, within an appropriate one of the message queues 206, 208 and 210.

The modified messages queue 210 is used to pass data from the packet receiver 200 to a device server process 220. Each entry in the modified messages queue 210 includes, by way of example, the following fields:

Single Data Message as received by the Packet Receiver Process

Identification of the MDS where the message come from

Alias name, added by the packet receiver 200 to the initially received message from the MDS The device server process 220 reads messages from the modified messages queue 210 and routes the retrieved messages to appropriate device (e.g., workstation, alarm database, printer, etc.) destinations according to routing information provided by the device database 202. The device server process 220 contains destination-specific threads that convert the retrieved messages to a format specified for the particular device type of the identified destination residing on the application network 104. The messages destined for the alarm database 110 pass through an alarm database collector 222. The collector 222 communicates with the alarm database 110 via the application network 104 to place the alarm data in the database 110. However, if the alarm database 110 is unavailable, then the alarm data is buffered in a temporary alarm data buffer 223. When the alarm database 110 becomes available, the buffered alarm data is retrieved from the buffer 223 and passed to the collector 222 before placing current alarm data in the database 110. As previously noted, device data can be updated during normal runtime operation of the message manager 100*a*. The device server 220 dynamically creates and deletes connections to devices via the application network 104 according to updates to the information placed by the packet receiver 200 in the device database 202.

In an exemplary embodiment, communications between the message manager 100*a* and an alarm management subsystem (AMS) on the workstations 108 proceed as follows.

At startup, the message manager 100*a* initializes with AMS targets.

After initializing, the message manager 100*a* sends an initialization message specifying a socket where the message manager 100*a* listens for AMS resynchronization messages.

The message manager 100*a* waits for an initialization request from an AMS.

Depending on the initialization request the message manager 100*a* starts sending alarms and events to the AMS over the connected communication.

If the message manager 100*a* detects a connection failure, the connections will be cleaned up and then the message manager tries with a 1 second cycle to re-establish the lost connection to the workstation.

In an exemplary embodiment, AMS server threads within the device server process 220 operate as message collectors for specific corresponding AMSs on the workstations 108. Each AMS server thread packs messages together so that a packet of messages is sent rather than single messages. A timer function ensures that messages are sent after a time period even if a message packet is not full. The time (e.g. 500 ms) and the number of messages (e.g. 3) will vary according to various implementations. All alarm messages are time stamped.

The message manager 100*a* includes a redundancy control subsystem 224 that facilitates exchanging information between the message manager partners of a redundant message management facility configuration. Examples of functions carried out by the redundancy control subsystem 224 include declaring a role and synchronizing configuration data. In the illustrative embodiment, the redundancy related data passes between the partners via the control network 102. However, such data can be passed via the application network 104 or even a third (e.g., dedicated) network link. The operation of the redundancy control subsystem 224 is customized according to a set of redundancy parameters stored in a system configuration file 226. During normal operation, threads within the device server 220 inform the redundancy control subsystem 224 about current status of connections to associated devices.

The message manager 100*a* includes a calculation and dynamic filtering process 228. The calculation and dynamic filtering process 228 relies on information from the configuration database 204 (described herein below with reference to FIG. 3). In particular, the process 228 reads information stored within a set of related tables/matrices, and mode and event definitions maintained in the configuration database 204. Such information is, by way of example, provided in the form of an XML file rendered by a message manager configurator (described herein below). The calculation and dynamic filtering process 228 retrieves a categorized message (previously placed by the packet receiver 202) from the categorized message queue 208 and initiates executing any commands associated with parameters provided in the categorized message (e.g., initiate a voice alarm, send a message, start a specified executable file, etc.). The parameters of the categorized message queue 208 entries include: a message ID (e.g., compound/block/alarm type combination) and a category ID (specifying a command to be invoked and/or action commenced). By invoking a command rather than merely pass the message/alarm to an identified destination device for the message on the application network 104, handling a message stored in the categorized message queue 208 is distinguished from handling of messages stored in the modified messages queue 210 (that are passed via the device server 220 to a particular destination based upon routing information in the device database 202).

In addition to the above-mentioned command execution function, the calculation and dynamic filtering process 228 also reads a message, previously placed by the packet receiver 202, from the variable definition messages queue 206 to identify changes in mode and/or event variables. An entry from the variable definition message queue 206 includes a single alarm state message associated with a mode or event variable.

In response to events and mode transitions specified by a retrieved entry from the variable definition message queue 206, the process 228 initiates executing configured parameter actions on one or more specified control block parameters. By way of example, and not limitation, the configured parameter actions include setting new alarm priority values based upon mode/event priority matrices provided for identified alarms. In a particular embodiment, the new priorities for particular alarms are transmitted by the message manager 100*a* to the control processor 106*a* in the form of an application object parameter action identifying a compound, block, and parameter/value.

During initialization the calculation and dynamic filtering process 228 reads category attributes and variable definitions from the configuration database 204. The calculation and dynamic filtering process 228 reads the variable determination message queue 206 and the categorized messages queue 208 and takes the following actions. A variable determination message is read from the queue and a new value for a mode or event variable is determined. The first messages in the variable determination message queue 206 are the CURRENT STATE messages from contact input (CIN) blocks that determine the values of mode and event variables. The values of the mode/event variables, in turn, are applied to a set of category action matrices to determine actions on parameters (e.g., assign a new priority to an alarm parameter) in view of the change to the mode/event state.

In view of the functionality performed by the calculation and dynamic filtering process 228 in conjunction with mode/event change messages retrieved from the variable determination message queue 206, when a mode or event variable changes, a table of action trigger message attributes is reviewed, and parameter values (e.g., alarm priorities) affected by the mode/event change are detected. For these parameters the new value (e.g., priority), configured in a table of action category attributes in the database 204, are determined and sent to the control processors in the form of parameter values on identified control blocks executing on the control processors. In processing event messages retrieved from the variable determination message queue 206, a mutual exclusivity indicator, defining whether an event is mutually exclusive or not, is taken into account. In such cases, the most recently received event is the only one taken into account when determining parameter actions. In the case of non-mutually exclusive events, the highest priority is used when more than one event is simultaneously set.

In closing, with regard to FIG. 2, it is noted that in the exemplary embodiment that a set of processes are utilized to carry out the message manager 100*a*. This arrangement ensures that when one of the processes fails, the other processes continue to function. Furthermore, an internal monitor process 230 is provided to oversee the operational status of each process of the message manager 100*a*. At startup, the monitor process 230 reads a list of message manager processes and parameters, describing the operation of the message manager, from the configuration database 204. The internal monitor process 230 detects monitored process failures and attempts to re-start the monitored process without re-starting the entire message manager.

Having described the general functional components that make up an exemplary message manager, attention is directed to a set of exemplary data structures utilized by the message manager to communicate with message delivery servers (MDSs) on the control processors 106 and alarm management subsystems (AMSs) on the workstations 108.

MDS/Message Manager (MM) Message Format

The data structures described below are exemplary MDS and MM message structures. The structures represent messages sent from the MDS to the MM and messages sent from MM to the MDS.

MDS_CONCAT_MSG: the structure of message packets exchanged between the MM and MDS. This data structure contains the following fields:

Header for all message packets (MDS_CONCAT_MS-G_HEADER)
    Buffer for a set of concatenated messages
        (the type for an incoming message is FROM_MDS_MSG, the type for an outgoing message is FROM_MM_MSG)

MDS_CONCAT_MSG_HEADER: the data structure contains common information pertaining to all the concatenated messages in the buffer, including:

A unique packet ID
    An array of indexes to the second through last messages in the buffer Format for Messages Received by the Message Manager The data structures described in this section represent incoming messages to the MM from the MDS. The MDS concatenates multiple messages, up to a specified value (MAX_MSG_PER_PACKET), in one message packet and then sends the packet to the MM. The maximum size of a packet is specified by a value MAX_PACKET_SIZE. The MDS_MAX_MSG_PER_PACKET (initially 10) and MDS_MAX_PACKET_SIZE (initially 5000) are configurable.

FROM_MDS_MSG: defines the various types of a single message delivered to the MM from MDS, and contains the following information:

---

Type of the message block (type of the union variant)
Union of the different types (described further herein below), namely:
    MDS_START_SESSION_REPLY_MSG: used for the message block type MM_START_SESSION_REPLY
    MDS_CLIENT_SIMPLE_REPLY_MSG: used for the message block types
        MM_END_CURRENT_STATE_UPDATE,
        MM_MESSAGE_MAITENANCE_REPLY,
        MM_TEMPORARY_DISCONNECT_REPLY,
        MM_RECONNECT_REPLY and
        MM_END_SESSION_REPLY
    MDS_DATA_MSG: used for the message block type MM_DATA_MESSAGE

---

MDS_START_SESSION_REPLY_MSG: defines the data structure of the reply to a start session message received by the MM and contains the following:

Error code
    Client Id generated by MDS

MDS_CLIENT_SIMPLE_REPLY_MSG: defines the data structure sent to the MM, is used for EndCurrentStateUpdate, MessageMaintenanceReply, TemporaryDisconnectReply, ReconnectRequestReply and EndSessionReply messages, and contains the following:

Error code

MDS_DATA_MSG: defines the data structure of data messages, and contains the following:

Message type (MESSAGE_TYPE)
Message mode type (MESSAGE_MODE_TYPE)
union containing the variants:
  Number of lost messages, if the message mode is CurrentStateMode or MessageMaintenanceMode;
  Group Id, if the message mode is MsgGroupDefinitionMode
Message size
Message buffer (limited to, for example, 256 bytes) The content of the message buffer depends on the message mode. If the message mode is MsgGroupDefinitionMode, then the buffer contains an array of device names. If the message mode is CurrentStateMode or MessageMaintenanceMode, then the buffer contains messages provided by a control processor or a data provider.
MESSAGE_TYPE: defines message types sent by the MDS to the MM.
  E.g., PROCESS_ALARM_MSG, CONTROL_MSG and MSGGROUP_DEFINITION_MSG
MESSAGE_MODE_TYPE: defines all modes during which data messages are sent by the MDS to the MM.
  E.g., MESSAGE_MAINTENANCE_MODE, CURRENT_STATE_UPDATE_MODE and MSGGROUP_DEFINITION_MODE Format of Messages Sent by the MM The data structures described herein below represent outgoing messages from the MM to the MDS. The MM sends only one message in a message packet.

FROM_MM_MSG: defines the various types of a single message delivered from MM to MDS, and contains the following:

- Type of the message block (type of the union variant)
- Union of the different types; namely
  MDS_START_SESSION_MSG: used for the message block type
    MDS_START_SESSION
  MDS_CLIENT_REQUEST_MSG: used for the message block types
    MDS_START_CURRENT_STATE_UPDATE,
    MDS_MESSAGE_MAITENANCE,
    MDS_TEMPORARY_DISCONNECT,
    MDS_RECONNECT_REQUEST and
    MDS_END_SESSION
  MDS_RECEIPT_CONFIRMATION_MSG: used for the message block type
    MDS_RECEIPT_CONFIRMATION
    MDS_START_SESSION_MSG MDS_START_SESSION_MSG: defines the data structure sent by the MM to indicate a session start, and contains the following:
  Name of the MM
MDS_CLIENT_REQUEST_MSG: defines the data structure sent by the MM. It is used for StartCurrentStateUpdate, MessageMaintenance, TemporaryDisconnect, ReconnectRequest, EndSession and ConfigQuery messages, and contains the following:
  Client Id generated by the MDS
MDS_RECEIPT_CONFIRMATION_MSG: defines the data structure sent by the MM to confirm receipt of a data message packet, and contains the following:
  Client Id generated by the MDS
  Packet Id Data Messages Received by the MM Provided by the Control Processor or a Data Provider MDS_MSG defines the data structure received by the MM and provided by a Control Processor or a Data Provider through MDS. These messages are received by the packet receiver 202. MDS_MSG is used to format a buffer in MDS_DATA_MSG if the message mode is CurrentStateMode or MessageMaintenanceMode, and contains the following:
  Header containing type, time and group id ( )
  Union of the different message types (described herein below); namely
  Process Alarm Messages (MDS_ALARM_MSG)
MDS_MSG_HEADER: defines the header for data messages delivered by the MDS and contains the following:
  Message type
  Time/date of occurrence in 64-bit UTC
  Message group ID
MDS_ALARM_MSG: is a process alarm-specific part of a Data Message for a Process Alarm Message type, and contains the following information:
  Alarm type
  Control Processor name
  Alarm tag name
  Alarm type message
  Point number (valid for BLNALM and PID blocks only)
  Statement number (valid for sequence blocks only)
  Operational error (valid for sequence blocks only)
  Parameter name
  Inhibit print option
  Length of the loop ID field at the end of the message
  Alarm Acknowledgement State
  Monotonic time counter
  Time is valid flag
  Priority
  Step number (valid for sequence blocks only)
  Subroutine number (valid for sequence blocks only)
  Exception number (valid for sequence blocks only)
  Alarm limit (threshold)
  Value of the parameter causing the alarm condition
  Length of the block descriptor field at the end of the message
  Length of the alarm message text field at the end of the message
  Length of the in/out field at the end of the message
  Length of the engineering units field at the end of the message
  Length of the state text field at the end of the message
  Text buffer holding the loop ID, block descriptor, alarm message text, in/out field, engineering units, and state text (not all are present for all messages)

Messages Sent from the MM to AMSs Running on Workstations

The following describes a set of exemplary message structures used to send messages from the MM to the AMSs running on the Workstations 108. These message structures represent messages sent from the MM to an Alarm Alert (AA) task. The Alarm Alert task is the part of the AMS that communicates with the MM via the application network 104. The data structures described herein below represent incoming messages to the AA from the MM. The MM concatenates multiple messages, up to MAX_MSG_PER_PACKET, in one message packet and then sends the packet to the AA. The maximum size of a packet will be MAX_PACKET_SIZE. By way of example, the MAX_MSG_PER_PACKET is equal to 3, and the MAX_PACKET_SIZE is equal to 2048, but both values can be altered.

AMS_CONCAT_MSG: used in defining the message packets. This data structure contains the following:
  Common header for all MM to AA messages (AMS_CONCAT_MSG_HDR)

Buffer for the concatenated messages (AMS_MM_MSG)

AMS_CONCAT_MSG_HEADER: contains information pertaining to the concatenated messages in the buffer. By way of example, the common header includes:

Unique packet ID

Array of indexes to the second through last messages in the buffer

AMS_MM_MSG: defines the delivered message and contains the following:

Common header for all alarm messages (AMS_MESSAGE_HEADER)

Alarm message content (MM_TO_AMS_MSG)

AMS_MESSAGE_HEADER: defines the data items common to all types of alarm messages and contains the following:

Overall message type; 100—process alarm message, 200—system alarm message, or 500—initialization message; 510—CP status message Time/date of alarm occurrence represented in binary UTC MM_TO_AMS_MSG: defines the various types of messages delivered from the MM to the AA. This data structure is the union of the different types of messages (described herein below); namely:

Initialization messages (AMS_MM_INITIALIZATION_MSG)

CP status messages (AMS_MM_CPSTATUS_MSG)

Process alarm messages (AMS_PROCESS_ALARM_MSG)

With regard to each of the above-identified messages:

AMS_MM_INITIALIZATION_MSG: defines the initialization message format sent from the MM to the AA task. This is the first message sent by the MM after the MM connects to the AA and the AA accepts that connection, and contains the following:

MM name

MM connectionless socket; AA will use this to send back its initial message

AMS_MM_CPSTATUS_MSG: defines the message format associated with control processor (CP) status messages. These messages are sent from MM to the AA task when a CP stops sending alarms or resumes sending alarms to the MM, and contains the following:

CP address/name

CP Status (0—CP stopped sending alarms; 1—CP resumed sending alarms)

MM connectionless socket (used by the AA to send back its initial message)

AMS_PROCESS_ALARM_MSG: defines the process alarm message format sent from the MM to the AA task, and contains the following:

Alarm message type; used primarily for process alarm messages (e.g. HIABS, INFO)

Address/Name of the CP generating the message

Alarm tag name; support for nested compounds

Tag name alias configured in MM

Alarm name text

Alarm type text (e.g. "HIABS", "INFO")

Parameter that caused the alarm to occur

Acknowledged state

Alarm priority (e.g. 1, 2, 3, 4, 5)

Analog alarms only; the alarm threshold for the parameter causing the alarm condition Analog alarms only; the actual value for the parameter causing the alarm condition BLNALM and PID blocks only; point number Sequence blocks only; stmno, caseno, or timeout Sequence blocks only; operational error Sequence blocks only; step number Sequence blocks only; subroutine number Sequence blocks only; exception handler number Length of the Loop ID—Batch (max=32)

Length of the Block Description (max=32)

Length of the Alarm Text (max=32)

Length of the Engineering Units (max=32)

Length of the State Text (max=32)

Buffer for Loop ID, Block Description, Alarm Text, Engineering Units, and State Text AMS_SYSTEM_ALARM_MSG: defines the system alarm message format sent from the MM to the AA task, and contains the following:

Alarm message type (e.g. STATN, DEVICE, DISABL)

ID of the station generating the message

Alarm tag name; support for nested compounds

System Monitor name

Device ID

Subsystem ID

Acknowledged state

Alarm priority (e.g. 1, 2, 3, 4, 5)

Length of the Alarm Text (max=80)

Length of the Extra Info (max=80)

Buffer for Alarm Text and Extra Info

Messages from AMS (Workstations) to the MM

The message structures described herein below are utilized by the AA tasks to send messages to the MM.

AMS_TO_MM_MSG: defines the messages delivered from the AMS to the MM. This data structure is the union of the different types of messages. By way of example, an not limitation, one message type is an initialization message. However any of a variety of message types are contemplated. The AMS_AA_INITIALIZATION_MSG initialization message structure, supported by the more general AMS_TO_MM_MSG structure, is described herein below.

AMS_AA_INITIALIZATION_MSG: defines the initialization request sent from the AA to the MM, is a request for the MM to begin delivering messages to restore the AA database with missed alarm messages, and contains the following fields:

Identification (name/address) of a workstation upon which the AA resides

Packet ID (i.e. >0—ID of the last packet processed by the AA task; −1—Recover all alarms from the CPs; −2—Do not recover; just send new alarms)

As an alternative to the above-described AMS/MM message formats, the following message formats are utilized to send alarm messages from the MM to the AA task running on a workstation. These message formats are also used to send process and system alarm messages to a printer (as a print command with an attached buffer containing the alarms to be printed).

ALARM_MSG: a buffer defined in a header definition (e.g., alarmmsg.h) is used to send process alarm messages from the MM to the AA (or alarm printer).

S_APRNF: a buffer defined in a header definition (e.g., aprintf.h) is used to send user defined messages via APRINT to an alarm printer.

Having described the general functional components and message structures associated with the message management facility 100, attention is directed to a message manager configurator that is used to specify/tune the operation of the message management facility 100. The message manager configurator enables specifying the following:

alarm messages in a message table, assigning aliases and command categories to process alarms, command categories, groups of alarms with the same behavior with respect to execution of external commands (see below), commands to be executed on occurrence of alarm messages, including the output of voice messages, action triggers, assigning action categories to blocks or any other appropriate process control structure maintained by a control processor (or process controller), action categories, building groups of blocks with the same behavior with respect to parameter actions on mode or event changes (see below), parameter actions (set new values to parameters, e.g. for reprioritization) and mode/event matrices of parameter actions, named modes and events assigned to CIN Blocks, mutually exclusive events, alarm shower parameters, and a name identifying the configured data set for message managers.

Figure 3:
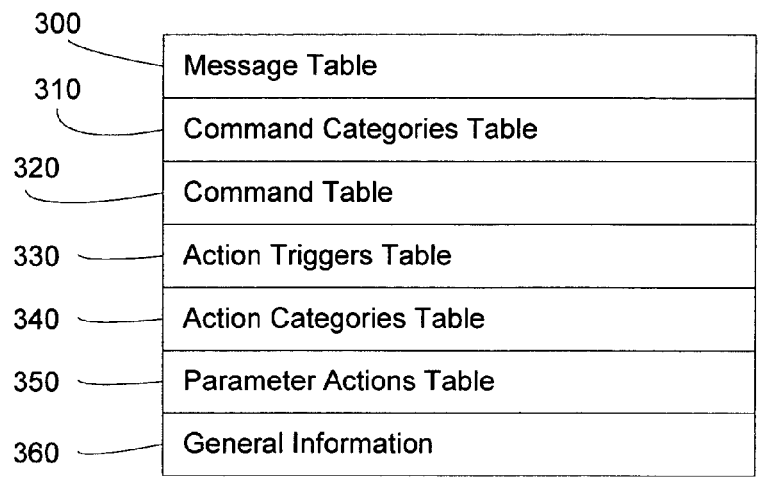
FIG. 3 is an exemplary list of types of information stored in a configuration file used to build a configuration database that governs the runtime operation of the exemplary message management facility depicted in FIG. 2.

The configurator output, referred to as a "message manager configuration set", is stored in the form of an XML file. With reference to FIG. 3, the message manager configuration set that is used to build the configuration database 204 includes a message table 300, command categories table 310, command table 320, action trigger table 330, action category table 340, parameter action table 350, and general information table 360.

General Information 360

In an exemplary embodiment, the general information 360 includes: a configuration name, a definition of modes, a definition of events, and alarm shower parameters. As mentioned previously above, the message manager 100a utilizes alarm states of CIN blocks to determine current values for mode and event variables. The numbers of configured modes and events define a 2-dimensional matrix organizing up to 32 fields (cells) for specifying resulting parameter actions. The parameter actions are potentially utilized for reprioritization, inhibition, and disablement of alarms. The data within the general information 360 contains the following information:

matrix definition (one list defining the logical names and the CIN block associations for the different modes and one list defining the logical names and the CIN block associations for the different events)

an indicator defining whether the events are mutually exclusive;

indicators for the definition, including whether the matrices are one-dimensional (only modes or only events) or two-dimensional (both modes and events);

the alarm shower parameters include, in addition to an alarm shower detection enabled/disabled toggle variable, parameters defining when an alarm shower is occurring. By way of example, the shower detection parameters stored in the configuration database 204 include:

number of unacknowledged alarms period in which the unacknowledged alarms have to occur A threshold alarm priority parameter specifies an alarm priority level required for passing an alarm, by the message manager, to connected devices while in the alarm shower mode of operation. During an alarm shower, alarms having a priority below the threshold priority are not forwarded by the message manager to connected devices on the application network 104. Such alarm messages are instead discarded by the packet receiver 200 of the message manager 100a.

The above-identified alarm shower parameters are one example of many potential ways to suppress a sudden surge of alarms so that only ones meeting a particular priority threshold are passed along to devices. For example one may instead measure a shower based upon alarms passed to a particular device rather than all received alarm messages. Such modification, addresses the differing capabilities of various specific destinations on the application network 104 to handle high volumes of alarm messages. Also, the alarm threshold may be applied in a stepped manner such that as the number of unacknowledged alarms increases, the threshold priority raises (as a guard against setting too low a threshold priority). Furthermore, a further parameter facilitates specifying a minimum time period within which shower suppression will be turned on, once activated, to avoid excessive toggling between on/off shower suppression states.

Figure 4:
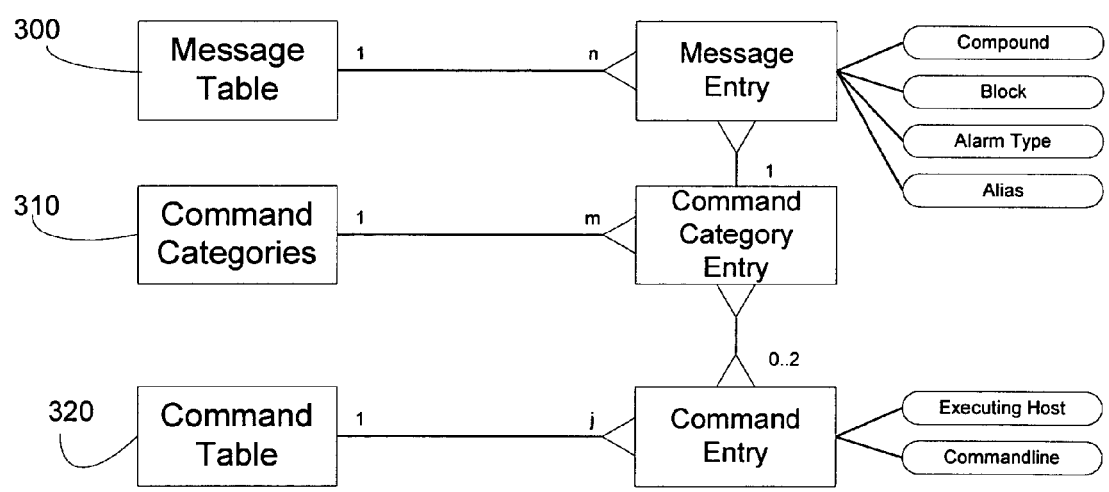
FIG. 4 graphically depicts relationships between configuration information relating to command categories used by a message manager to initiate commands as a result of receiving particular messages.

With reference to FIG. 4, the message table 300, command categories table 310, and command table 320 facilitate specifying particular commands that are invoked by the (active) message manager 100a in response to receiving messages having a particular message ID.

Message Table 300

The message table 300 includes a set of n message entries wherein each entry includes a set of message attributes that belong to a particular identified alarm message. Each entry contains, by way of example, the following information:

Message ID (Compound, Block and Alarm type) which acts as a unique key;

Alias name (enabling an alias to be assigned to an alarm messages before forwarding to a set of configured destinations on the application network); and (optional) Command Category ID that specifies a command categories table 310 entry associated with the message (including indicator for "not configured" if none is specified). The category ID is added to the received message before adding the message to the categorized messages queue 208.

The command category ID facilitates adding executable commands invoked through the message manager to the normal activity of forwarding alarm messages to designated destinations on the application network. In accordance with an exemplary embodiment, only one command category ID is assignable to a message. Thus, the properties of a single identified command category, if specified, can apply to a particular message table entry.

Command Categories Table 310

The command categories table 310 is populated by a set of m entries wherein each entry specifies attributes (e.g., executable commands) for each identified command category. By way of example, each entry in the table contains the following:

Command Category ID, that acts as unique key for specifying the particular command category; and Up to two command IDs identifying entries in the command table 320 associated with particular executable commands (e.g., output a voice message) (including a "not configured" indicator).

Command Table 320

The command table 320 contains a set of j entries corresponding to the various commands invoked by the message manager 100a on occurrence of particular alarms specifying a particular command ID. Each command table 320 includes, for example, the following information:

Command ID, that acts as unique key,

Host where the command is executed (including a "not configured" indicator), and thus a separate entry is included for each host where a command is potentially executed; and Command line to be executed including options and arguments (including a "not configured" indicator).

Figure 5:
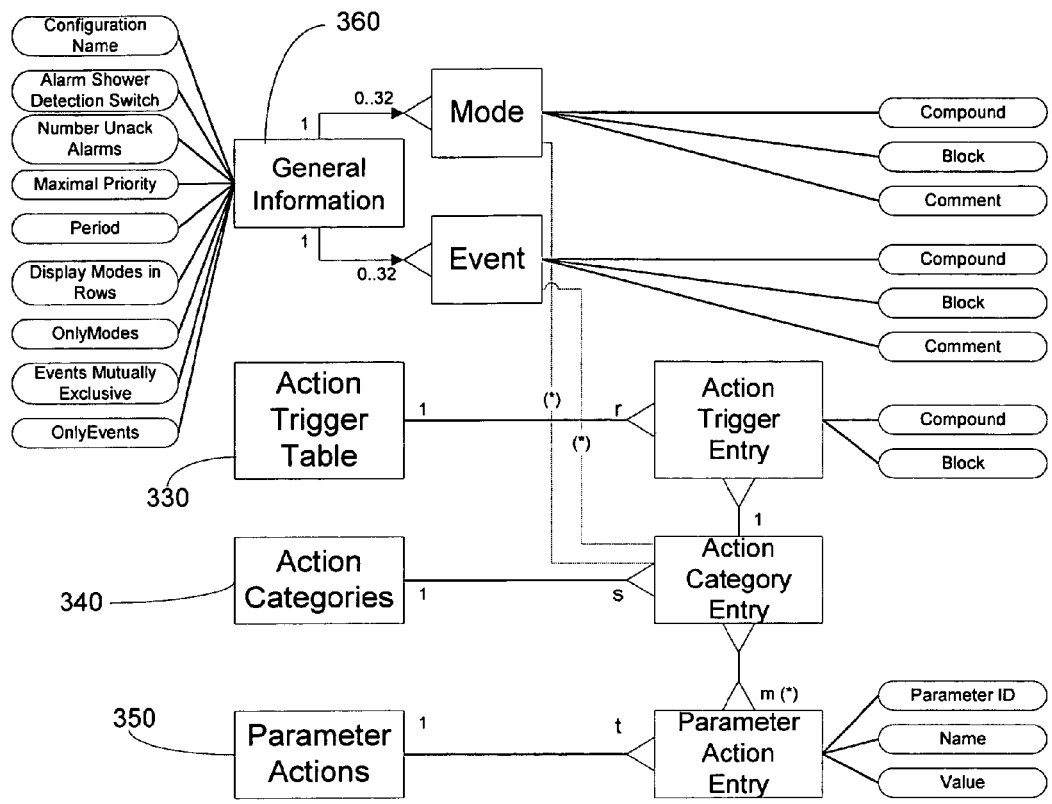
FIG. 5 graphically depicts relationships between configuration information relating to parameter action categories used by a message manager to initiate certain pre-configured actions in response to notifications of events/mode changes.

With reference to FIG. 5, the action triggers table 330, action categories table 340 and parameter actions table 350 contain configuration information relating to dynamically re-assigning priorities of particular alarms in accordance with mode changes or events received by the message manager 100.

Action Triggers Table 330

The action triggers table 330 includes a set of r entries corresponding to particular blocks, for which actions (e.g., setting a new alarm priority) are to be invoked when the mode or event changes. Each entry contains the following information:

Compound and Block, that together function as a unique key for a table entry (also function as the target compound and block for a parameter action specified in an application object specified in an action category matrix evaluated in view of a current event/mode state);

Action category ID specifying an alarm priority matrix within the action categories table 340 that is evaluated to determine one or more parameter actions.

Action Categories (Matrices) Table 340

The s matrices within the action categories table 340 contain parameter action IDs. A particular cell is accessed, within a matrix (corresponding to a specified action category ID), based upon a current mode and/or event, and the parameter action ID within the selected cell determines a group of one or more parameter actions accessed within the parameter actions table 350. Each matrix entry is associated with:

An Action Category ID, that acts as a unique key for a selected matrix;

Up to 32 mode/event-specific cells with parameter action IDs (e.g., specifying a new priority for an alarm) (including a "not configured" indicator)

Parameter Actions Table 350

Figure 6:
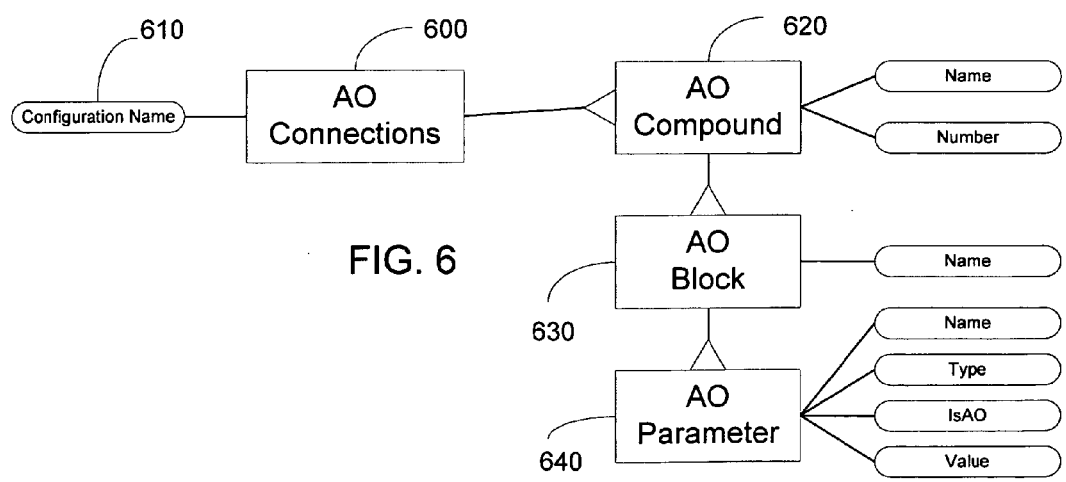
FIG. 6 graphically depicts the sources of information that supply information used to build application object connections used by a message manager to pass a parameter value to a particular target control block.

The parameter actions table 350 contains t entries specifying groups of m parameter actions, that have to be performed when a state alarm occurs which is configured to change the value of a mode or event variable. Each of the t entries in the table contains the following information:

Parameter Action ID (there may be multiple "m" entries in the parameter actions table having the same parameter action ID resulting in the execution of multiple parameter actions on a particular specified compound and block in response to an event or mode change), Name of the parameter, which has to be changed, value, to which the parameter has to be changed List of Application Object Connections (FIG. 6)

During runtime of the message manager 100a, parameter actions within the parameter actions table 350 are accessed/triggered, by changes to a mode and/or event state, to change values on target parameter instances maintained by control processors 106. Such parameter actions are carried out, for example, using application objects. FIG. 6 illustratively depicts the construction of an application object connection name corresponding to an application object connection. The application object connection name is thereafter used by the message manager 100a to pass a value invoking a parameter action on a specifically identified parameter (e.g., set a new alarm priority value on a particular compound/block/alarm combination). In an exemplary embodiment, each application object connection name 600 is established from the following application object connection configuration information:

a configuration name 610, which is unique for each message management facility 100 (including, for example, a redundant pair of Message Managers), a unique number identifying a compound 620 (that is also identified by name), a name identifying a block 630, and a name of a parameter 640.

In the exemplary embodiment the configuration name appended to the compound number makes up a unique application identification, the block name comprises the object part, and the parameter name comprises the attribute part of the whole application object connection name which is specified in the form of A:O.A (application:object.attribute). Changes in a previously saved configuration potentially removes parameter actions from the parameter action table 350. In response to such removal, corresponding application object connections are also removed. Removing an existing application object connection is done by overwriting a previously configured application object connection entry in the configuration database 204 with a default value.

Having described a set of components making up a message management facility configuration file with reference to FIGS. 3-6, a set of examples of configuration data included within such files is provided herein below. In the illustrative example, the configuration information is presented in the form of comma separated values (CSV) which are readily parsed and used by a number of editor programs.

The general information 360 includes four keyword lines containing special keywords as the first entry in the line. Each of these four key-word lines mark the beginning of a particular section of the general information 360. The first line of the general information contains a first keyword line that specifies whether alarm shower detection is switched on. The two alternatives comprise, for example, "ALARM_SHOWER_DETECTION_ON" and "ALARM_SHOWER_DETECTION_OFF." If alarm shower detection is specified to be on, the first keyword line is followed by a line, before the second keyword line, having three values. The three values represent the alarm shower parameters: number of unacknowledged alarms (range 1 to 10,000), time period in milliseconds (range 1000 to 60000) and threshold alarm priority (range 1 to 5).

The second keyword line of the four keyword lines determines whether the modes are displayed in rows or columns of an action categories matrix (displaying priorities for an alarm according to present mode/event status). This display option facilitates displaying the mode/event matrices based on the number of modes and the number of events. The content of the second keyword line is either "DISPLAY_MODES_IN_ROWS" or "DISPLAY_MODES_IN_COLUMNS". After the second keyword line and before the third keyword line, multiple lines are inserted that contain three values defining the supported modes (one mode per line).

A third keyword line determines whether listed events are mutually exclusive. The content of the second keyword line is either "EVENTS_MUTUALLY_EXCLUSIVE" or "MULTIPLE_EVENTS_AT_THE_SAME_TIME)".

Between the third keyword line and the fourth keyword line, multiple lines are provided that contain three values defining the events (one event per line).

A forth keyword line determines whether the matrices are one-dimensional or two-dimensional. One-dimensional matrices are defined either by only modes or by only events, two-dimensional matrices contain cells defined by both modes and events. The text of the fourth keyword line is either ONLY_MODES, ONLY_EVENTS or MODES_AND_EVENTS. If ONLY_MODES is specified, then an error is generated at validation time if there are any lines (defining events) between the third and the fourth keyword lines. Similarly, if ONLY_EVENTS is specified, then an error is generated at validation time if there are any lines (defining modes) between the second and the third keyword lines.

General Information Example:

```
ALARM_SHOWER_DETECTION_ON
50,100,2
DISPLAY_MODES_IN_COLUMNS
MODECOMPOUND,BLOCKMAINT,MAINTENANCE
MODECOMPOUND,BLOCKSTART,START
MODECOMPOUND,BLOCKNORMAL,NORMAL
MODECOMPOUND,BLOCKSHUT,SHUTDOWN
EVENTS_MUTUALLY_EXCLUSIVE
EVNTCOMPOUND,BLOCK001,TRIGGER
EVNTCOMPOUND,BLOCK002,STOP
EVNTCOMPOUND,BLOCK003,HIGH PRIORITY
EVNTCOMPOUND,BLOCK004,NOTICE
EVNTCOMPOUND,BLOCK005,SPECIAL EVENT
MODES_AND_EVENTS
```

The message table file 300 contains five entries per line separated by commas. All four separators (commas) are mandatory. Entries may be empty for data exchange, but may be required later for correct validation. The first three entries in a line contain the message ID including: a compound ID, a block ID and alarm type ID. The fourth entry specifies a command category ID for the message. The fifth entry represents the alias name. As shown in the first line of the example below, if the alias name contains any comma this entry is quoted. If the alias contains any quote symbol, the whole alias is quoted and the internal quote is doubled.

Message Table Example:

```
IACOMPOUND01,BLOCKNAME001,HIOUT,A001,"Alias,incl.""","""
(commas"es)"
IACOMPOUND01,BLOCKNAME002,LOABS,CATEG003,Alias name
without any comma
IACOMPOUND02,BLOCKNAME001,HIABS,,No category defined
IACOMPOUND03,NEWBLOCK,LODEV,NOALIAS,
IACOMPOUND03,BLOCKNAME001,HHABS,C003,Alias Text for
this Alarm.
```

The command categories table 310 contains three entries per line separated by commas. The separators are mandatory. Entries may be empty for data exchange, but may be required later for correct validation. The first entry specifies a command category ID. The second and third entries identify up to two commands (by name/identifier) to be executed for alarms specifying the command category ID identified in the first entry of the line.

Command Categories Table Example:

```
CATEG003,APPLICATIONA,VOICEMSG01
A001,APPLICATIONE,
C003,,VOICEMSG02
C004,APPLICATIONC,VOICEMSG03
C005,,VOICEMSG04
NOALIAS,APPLICATIOND,
A002,,
A003,,VOICEMSG05
STRING-15-CHARS,,
```

The command table 320 contains three entries per line separated by commas. Both separators are mandatory. Entries may be empty for data exchange, but may be required later for correct validation. The first entry contains the command ID (specified by entries of the command category table 310). The second entry contains the hostname of a network node that will execute the command/action. The third entry contains command line text (including any parameter values needed to invoke a desired action). If the command line contains a comma, then the command line entry is quoted. If the command line contains any quote symbol, the command line is quoted and the internal quote is doubled.

Command Table Example:

```
VOICEMSG01,WP07C1,C:\Prog\WinMediaPl\mplayer2.exe/Play CheckAlarm01.wav
VOICEMSG02,AWXNT1,C:\Prog\WinMediaPl\mplayer2.exe/Play HighPriority.wav
VOICEMSG03,AWXNT2,C:\Prog\WinMediaPl\mplayer2.exe /Play Horn.wav
VOICEMSG04,WP08D2,C:\Prog\WinMediaPl\mplayer2.exe /Play Attention.wav
VOICEMSG05,WPAA00,C:\Prog\WinMediaPl\mplayer2.exe /Play Music.wav
APPLICATIONA,WPAB00,"C:\Prog\AppendLogEntry.exe""AlarmType01Occurred"""
APPLICATIONB,AWC1D1,"C:\Prog\AppendLogEntry.exe""AlarmType02Occurred"""
APPLICATIONC,AWC2D1,"C:\Prog\AppendLogEntry.exe""AlarmType03Occurred"""
APPLICATIOND,AWC3D1,"C:\Prog\CopyLog.exe"
```

The action triggers table 330 contains three entries per line separated by commas. Both separators are mandatory. Entries may be empty for data exchange, but may be required later for correct validation. The first entry contains a compound ID and the second entry identifies a block ID for which actions have to be triggered when a mode or event changes. The third entry contains an action category ID specifying an entry within the action categories table 340.

Action Triggers Table Example:

```
IACOMPOUND01,BLOCKNAME001,TABLEA01
IACOMPOUND01,BLOCKNAME002,TABLEC01
IACOMPOUND01,BLOCKNAME003,EXCEPTIONTABLE
IACOMPOUND01,BLOCKNAME004,TABLED01
```

The action categories table 340 contains a variable number of entries dependent on the number of modes and the number of events. The total number of entries per line is equal to (number-of-events*number-of-modes)+1. All separators are mandatory. Entries may be empty during data exchange, but may be required later for correct validation. The first entry contains the action category ID (referenced by entries in the action triggers table 330). All the remaining entries of the line (from the second to the last) contain the parameter action IDs (corresponding to entries in the parameter actions table 350) that are stored in a matrix corresponding to the action category ID. The number of modes and the number of events depend on the current configuration in the general information file where the modes and events are defined. Therefore, for the import of the action categories table 340 into the message management facility 100, the number of modes and events must already be configured as needed for the action categories in the file. If the general information table 360 is empty, then a file containing the general information is read to obtain a number of events and number of modes. The data is thereafter stored within a table mode by mode including all events for each mode.

Example Action Categories Table (note: the names assigned to the first line such as MxEy are chosen to demonstrate the how the elements of each mode/event matrix are stored rather than the actual values stored at the location.):

```
TABLEA01,M1E1,M1E2,M1E3,M1E4,M1E5,M2E1,M2E2,M2E3,M2E4,
    M2E5,M3E1,M3E2,M3E...
TABLEB01,REPR1,NOINHIB,,,,REPR2,,R2NOD0,,INHALMGRP2,
    REPR3,INHIB,,,,REPR4...
TABLEC01,REPR1,INHIB,R1NOD0,INHALMGRP1,INHALM2,
    REPR2,,R2NOD0,,INHALM2,REPR3,,...
EXCEPTIONTABLE,REPR1,REPR2,REPR3,REPR4,REPR5,,,,,,,,,,,,
TABLED01,,INHIB,,,,,NOINHIB,,,,,INHIB,,,,,NOINHIB,,,
```

The parameter actions table 350 contains three entries per line separated by commas. Both separators are mandatory. Entries may be empty for data exchange, but may be required later for correct validation. The first entry contains a parameter action ID referenced by a matrix entry from the action categories table 340. The second entry contains a parameter name. The third entry contains a new value for the parameter identified in the third entry. The parameters for which new values are set include, by way of example, alarm priorities. However, any parameter value is potentially modified using this mode/event-driven value selection procedure.

Parameter Actions Table Example:

```
M1E1,HHAPRI,3
M1E1,OUTPRI,2
M1E2,HHAPRI,1
M1E3,HHAPRI,2
M1E4,HHAPRI,4
M1E5,MEASPR,2
...
M4E1,MEASPR,2
M4E2,MEASPR,3
M4E3,OUTPRI,1
M4E4,OUTPRI,2
M4E5,MEASPR,4
REPR1,MEASPR,1
REPR2,MEASPR,2
REPR3,MEASPR,3
REPR4,MEASPR,4
REPR5,MEASPR,5
INHALMGRP1,INHIB,0
INHALMGRP1,INHALM,48
INHALMGRP2,INHIB,1
INHALMGRP2,INHOPT,1
INHALM2,INHIB,1
INHALM2,INHOPT,2
R1NOD0,MEASHL,80
R2NOD0,MEASLL,10
R3YESD2,MEASPR,3
R3YESD2,INHIB,1
R3YESD2,INHOPT,2
```

-continued

```
INHIB,INHIB,1
NOINHIB,INHIB,0
```

Having described the set of configuration tables created/edited by a message manager configurator for the message management facility 100, attention is directed to a set of graphical user interfaces associated with the message manager configurator that displays the above-described configuration tables in a readily understood manner for a system developer/engineer. In the illustrative example, the tables are accessed by selecting one of a set of correspondingly named tabs on the configurator application's main window. The content of each exemplary graphical user interface has been previously described and therefore will not be repeated here.

Figure 7:
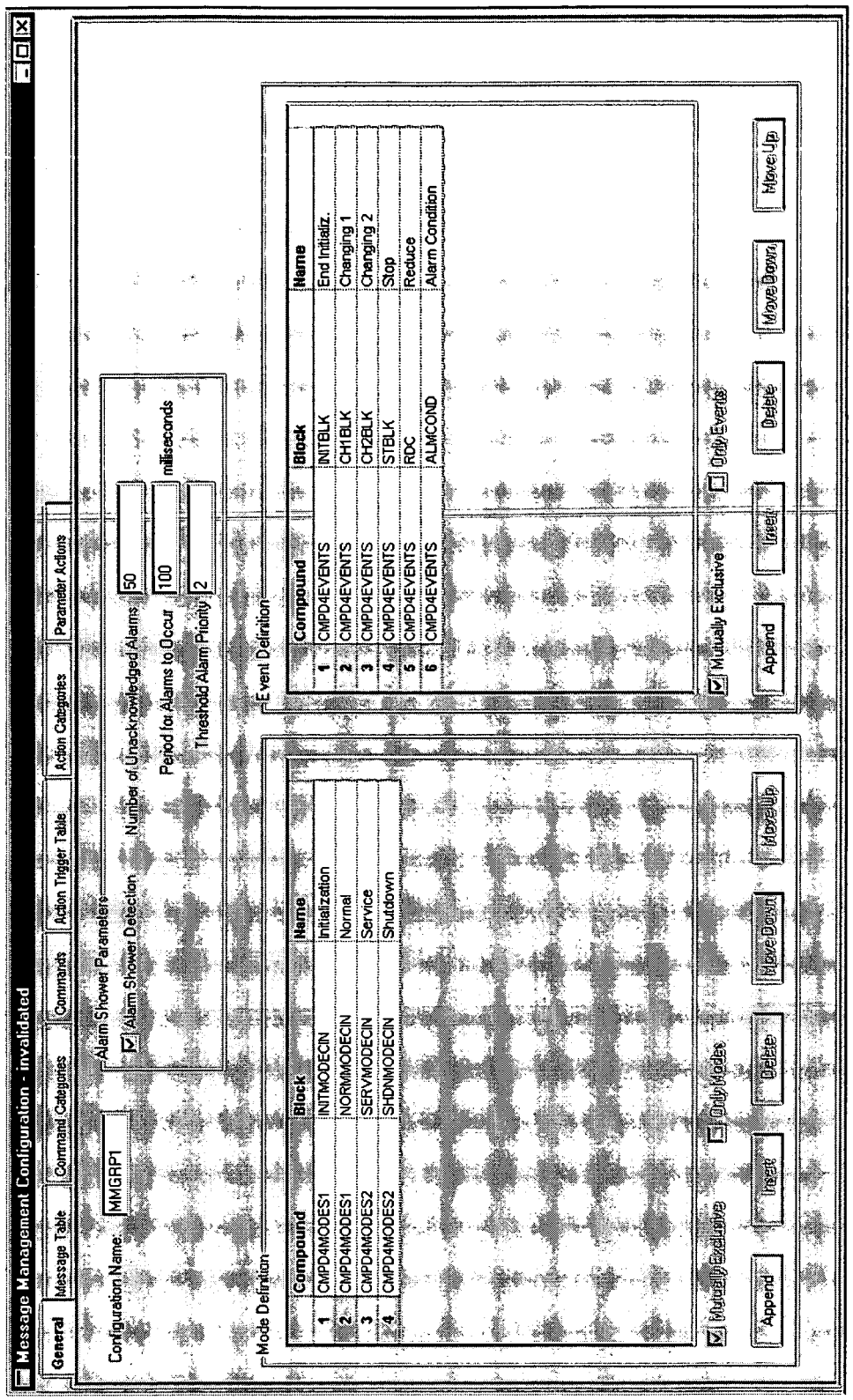
FIG. 7 is an exemplary graphical user interface for configuring general information relating to a message management facility configuration.

Turning initially to FIG. 7 an exemplary graphical user interface depicts the information associated with the general information table 360. The page displaying the contents of the general information table 360 comprises four groups of data: a configuration name (e.g., MMGRP1), the presently configured alarm shower parameters (unacknowledged alarms—50, unacknowledged alarm counting period—100 milliseconds, and threshold priority—2), a set of mode definitions, and a set of event definitions). Alarm shower detection is activated/de-activated by toggling the checkbox next to the text "Alarm Shower Detection" and then applying the new configuration to the message management facility 100.

With regard to the portion of the graphical user interface depicted in FIG. 7, identified by "Mode Definition", a list of contact input (CIN) blocks defines the modes used for parameter actions (to set new values to parameters). Each entry in the list contains a compound and block supplemented with a mode name used as a title for a row/column of a mode/event matrix. The compound can be selected from a list of all compounds available in the system, or typed in directly. Once a compound is entered the block is similarly selected. The number of elements in the mode list defines the number of modes and thus one dimension of the mode/event matrix used for determination of parameter actions.

The check box "Only Modes" at the bottom of the mode list allows specifying the matrices for parameter actions to be one-dimensional and defined only by modes (no event can be defined). In an exemplary embodiment, the mode/event matrices are limited to 32 cells. Therefore, if "Only Modes" is checked, the number of modes must be less or equal than 32. If "Only Modes" is unchecked the product of multiplying the number of modes by the number of events specified in the general information for a particular configuration is less or equal than 32. So the maximum number of supported modes is limited by a previously configured number of events. Appending and inserting modes is disabled when the maximum allowed modes is reached.

With regard to the portion of the graphical user interface depicted in FIG. 7, identified by "Event Definition", a list of CIN blocks defines the events used for parameter actions (to set new values to parameters). Each entry in the list contains a compound and block supplemented with an event name used as a title for a row/column of the mode/event matrix. The compound can be selected from a list of all compounds available in the system, or typed in directly. Once a compound is entered the block is similarly selected. The number of elements in the list defines the number of events and thus one dimension of the mode/event matrix used for determination of parameter actions.

The check box "Only Events" at the bottom of the list allows specifying the matrices for parameter actions to be one-dimensional and defined only by events (no mode can be defined). As mentioned above, in an exemplary embodiment, the mode/event matrices are limited to 32 cells. Therefore, if "Only Events" is checked, the number of events must be less or equal than 32. If "Only Events" is unchecked the product of multiplying the number of modes by the number of events specified in the general information for the particular configuration is less or equal than 32. So the maximum number of supported events is limited by a previously configured number of modes. The buttons to append or insert further events are disabled as soon as the maximum is reached.

Turning to FIG. 8, an exemplary graphical user interface for displaying/specifying the contents of the message table 300 is depicted. As explained above, the message table 300 specifies a command category and/or an alias name for a message. Each message is uniquely identified by compound, block and alarm type. All three sub-fields must be filled out to avoid a validation error.

With regard to filling out the fields of an entry within the message table 300, a command category ID and/or an alias name is assigned to each displayed message entry. If a command category is not filled, then no command category is assigned to the message. If a command category ID is configured it is used as a search key for an entry within the command categories table 310. The compound name for a message entry is specified from a list of all compounds which are available in the system, or alternatively, typed in directly. Once a compound is entered a block is similarly selected. Thereafter, an alarm associated with the selected block is similarly designated. The command category ID may either be selected from a list or typed in directly. Furthermore, an optional alias name (a text message describing an alarm), if configured, is added by the packet receiver 200 in the message manager 100a to a received message at runtime.

Figure 9:
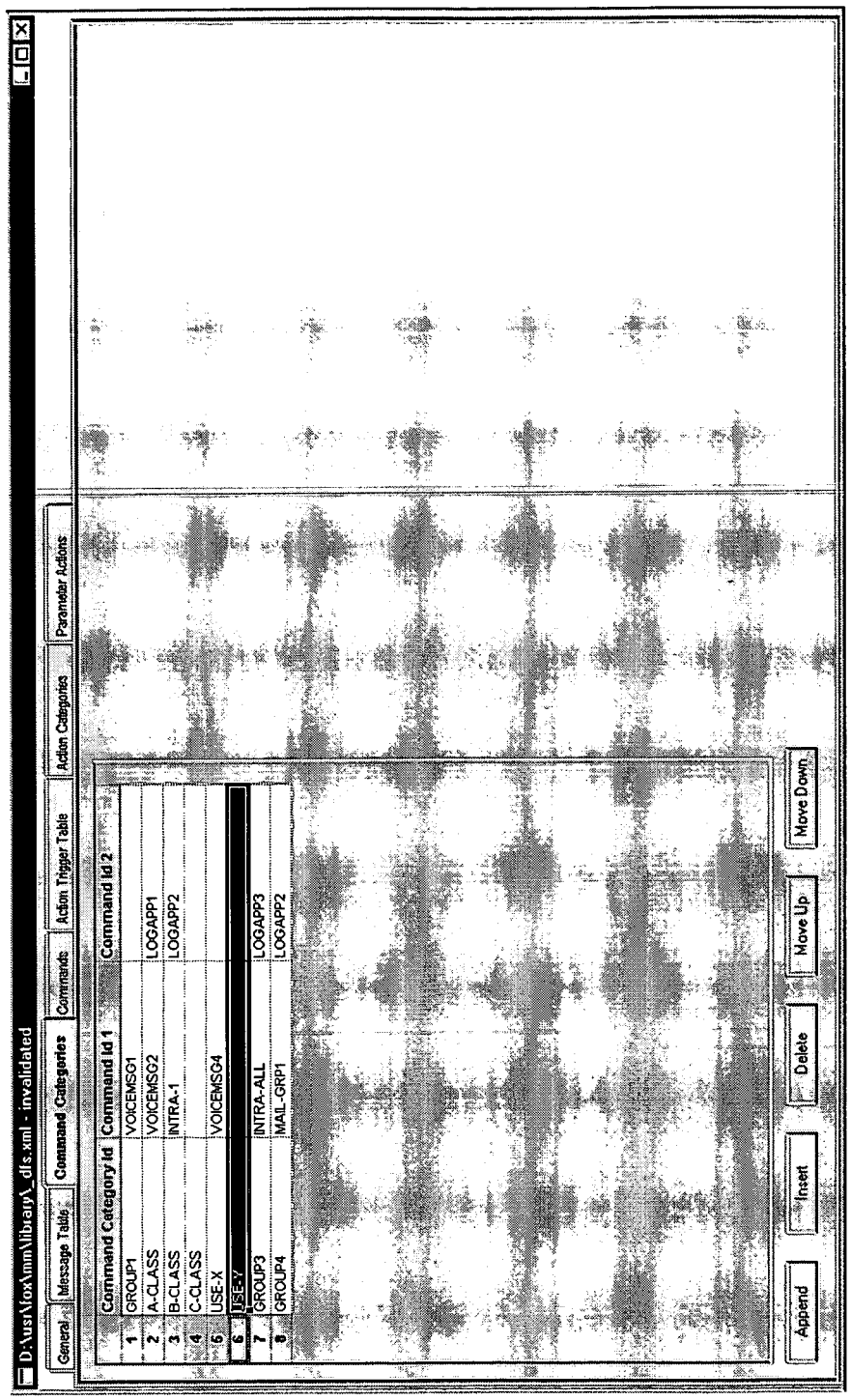
FIG. 9 is an exemplary graphical user interface for configuring contents of a command categories table.

Turning to FIG. 9, an exemplary graphical user interface for displaying/specifying the contents of the command categories table 310 is depicted. As explained above, the command categories table 310 includes a set of entries corresponding to classes of messages having a same behavior with regard to invoking specific commands (up to two) for execution. Examples of commands initiated by the message manager 100a in response to received messages include voice messages and external commands (directed to another machine such as one of the workstations 108 on the application network 104. With regard to playing a voice message, a command is invoked on a media player with an appropriately identified voice file (e.g., a .wav file stored on the target system). Configuring voice messages is handled in the same way as other executable commands.

Each entry in the exemplary command categories graphical user interface depicted in FIG. 9 includes up to two command IDs for each listed command category ID. The actual command commands corresponding to the command IDs are stored in the command table 320. Each cell in the columns "Command Id1" and "Command Id2" of the command category table allows alternatively the selection of an already defined command from a previously defined list or the direct input of a command identifier to be defined later.

Figure 10:
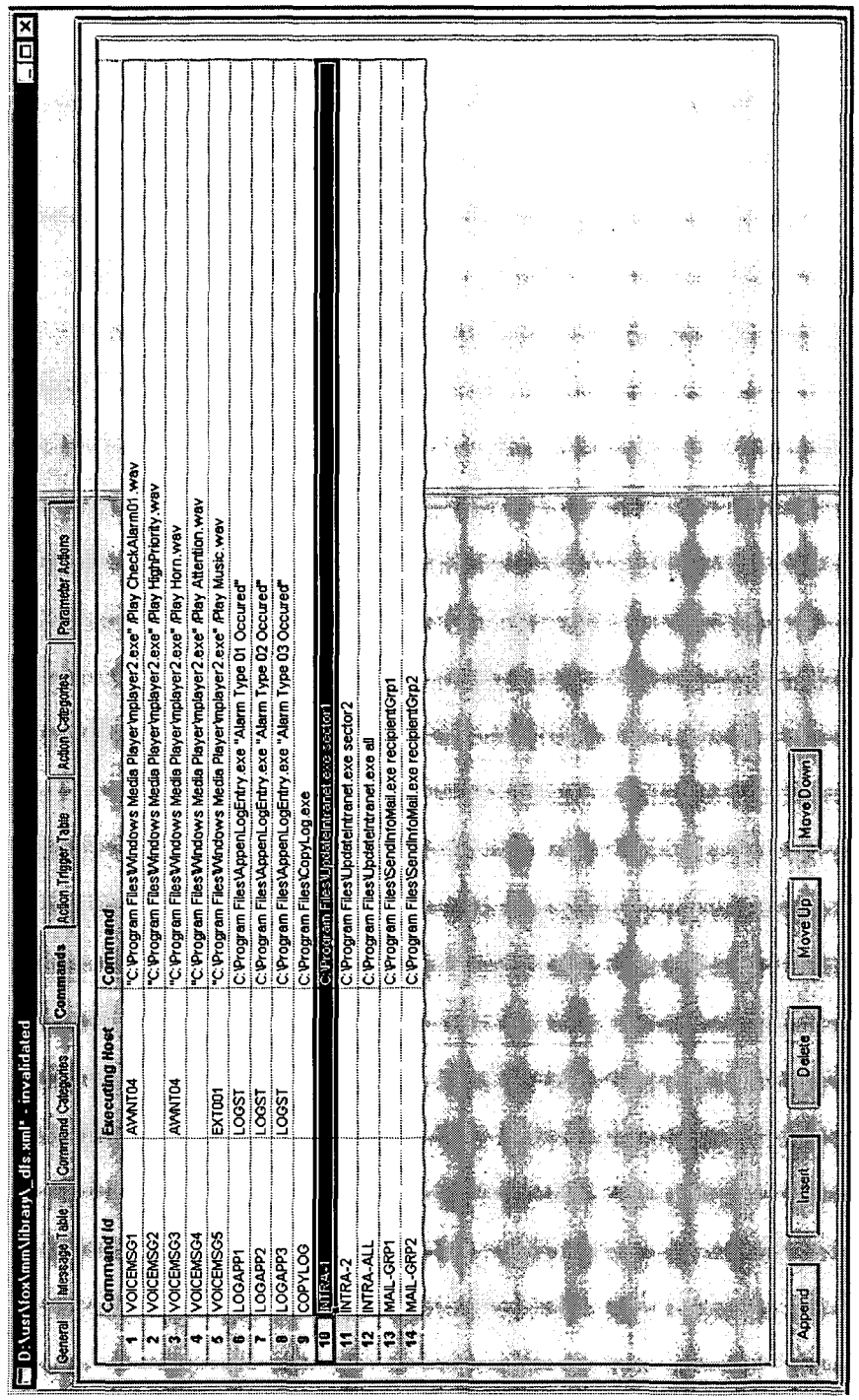
FIG. 10 is an exemplary graphical user interface for configuring commands corresponding to the commands identified in the command categories table.

Turning to FIG. 10, an exemplary graphical user interface provided by the configurator displays a list of command entries stored within the command table 320. As explained above, the command table defines commands triggered by reception of a particular message specifying a command category ID that in turn specifies a particular command ID corresponding to that command. Each command entry is identified by a unique name that is displayed in the Command ID column of the user interface. An Executing Host column displays the name assigned to the host designated to execute the command (e.g., play the voice message). If no host is specified, then the host is the local host upon which the message manager executes. The Command column displays a command line executed by the identified host. Entries are edited (added, deleted, modified) manually by a user via the exemplary user interface.

Figure 11:
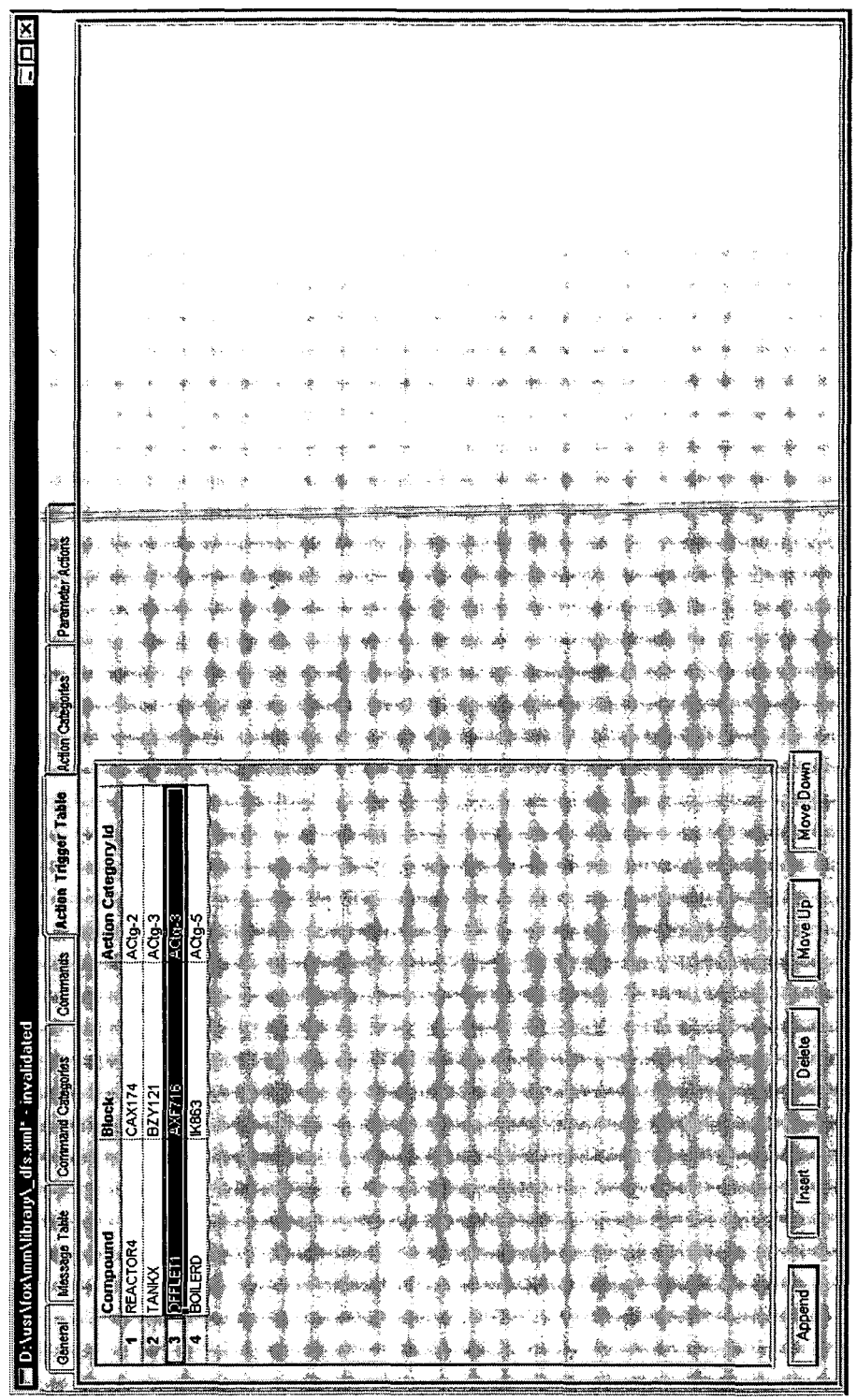
FIG. 11 is an exemplary graphical user interface for configuring an action trigger table identifying a set of action category IDs.

Turning to FIG. 11, an exemplary configurator graphical user interface is depicted that facilitates viewing and editing entries within the action triggers table 330. As explained above, the action triggers table facilitates attaching action categories to blocks for which parameter actions (e.g., specifying a new alarm priority value) are performed when a mode or event changes. A Compound column and Block column together uniquely identify a block upon which the parameter action is to be performed. An Action Category ID column specifies a unique action category ID that specifies a particular action category (matrix) to be evaluated to determine a parameter action ID that, in turn specifies one or more parameter actions performed on the specified compound:block combination.

Figure 12:
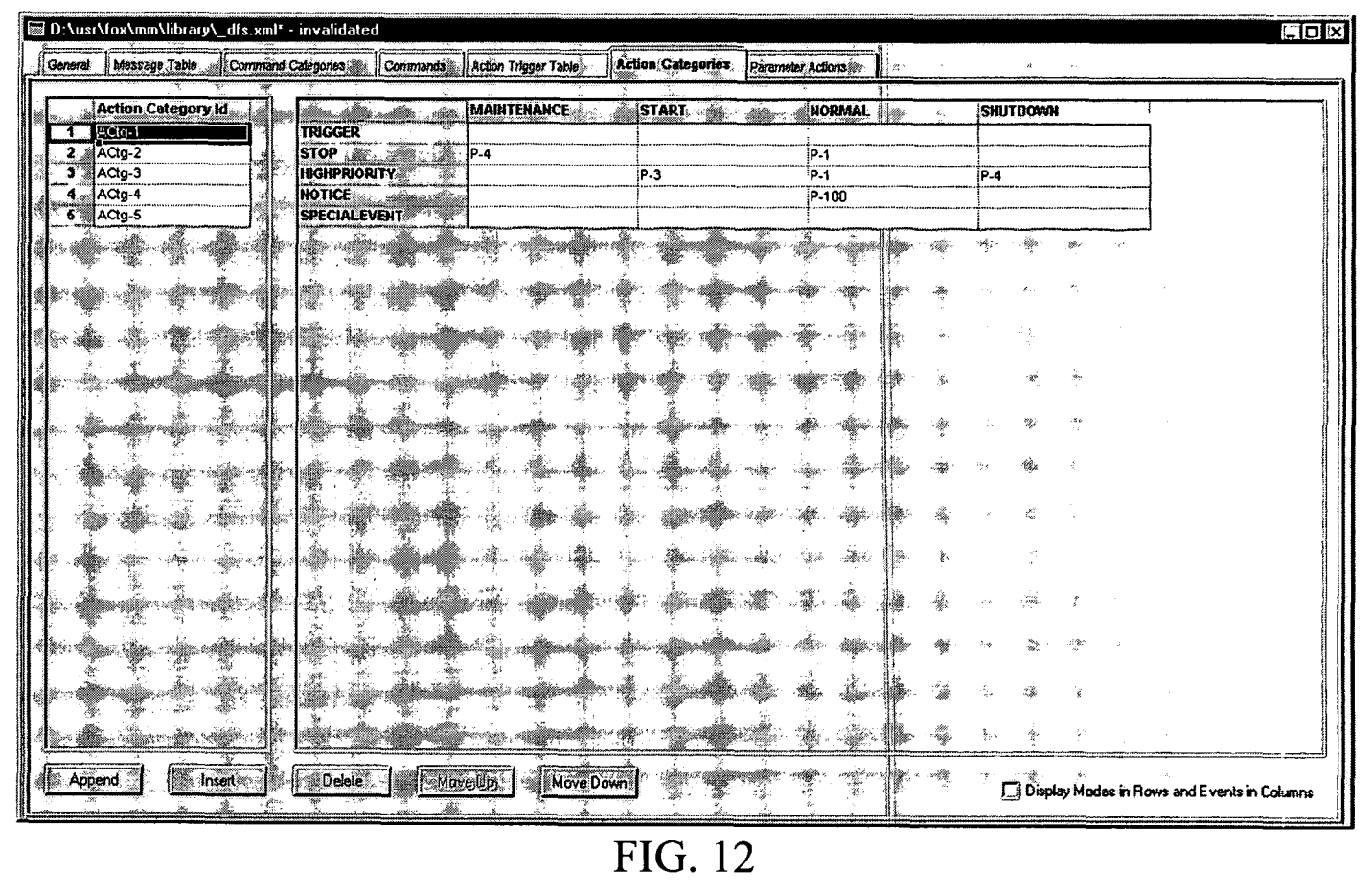

Referring to FIG. 12, an exemplary configurator graphical user interface displays the contents of a set of entries within the action category table 340. As described above, each entry of the action category table 340 defines a mode/event matrix having cells specifying parameter action IDs (further defined in the parameter actions table 350). In the illustrative graphical user interface, a list of all currently configured action category matrices is depicted under the section of the user interface entitled "Action Category ID".

When a user selects one of the listed entries under the Action Category ID, a corresponding mode/event matrix is displayed in the right-side panel of the graphical interface. The illustrative matrix for the currently selected ACtg-1 action category, is a two-dimensional matrix including four modes (identified in the column headings) and five events (identified at the head of each row)—resulting in a total of 20 potential cells for specifying a parameter action ID.

The matrix is one-dimensional, if either "Only Modes" or "Only Events" is checked on the "General" page of the configurator user interface. If "Only Modes" is checked, one cell for each mode is displayed and there is no event title above or before the cells. If "Only Events" is checked, one cell for each event is displayed and there is no mode title above or before the cells.

With regard to editing the content of the matrices, the graphical user interface allows selecting a previously defined parameter action from a list box or directly inputting a parameter action identifier—which is defined later.

Figure 13:
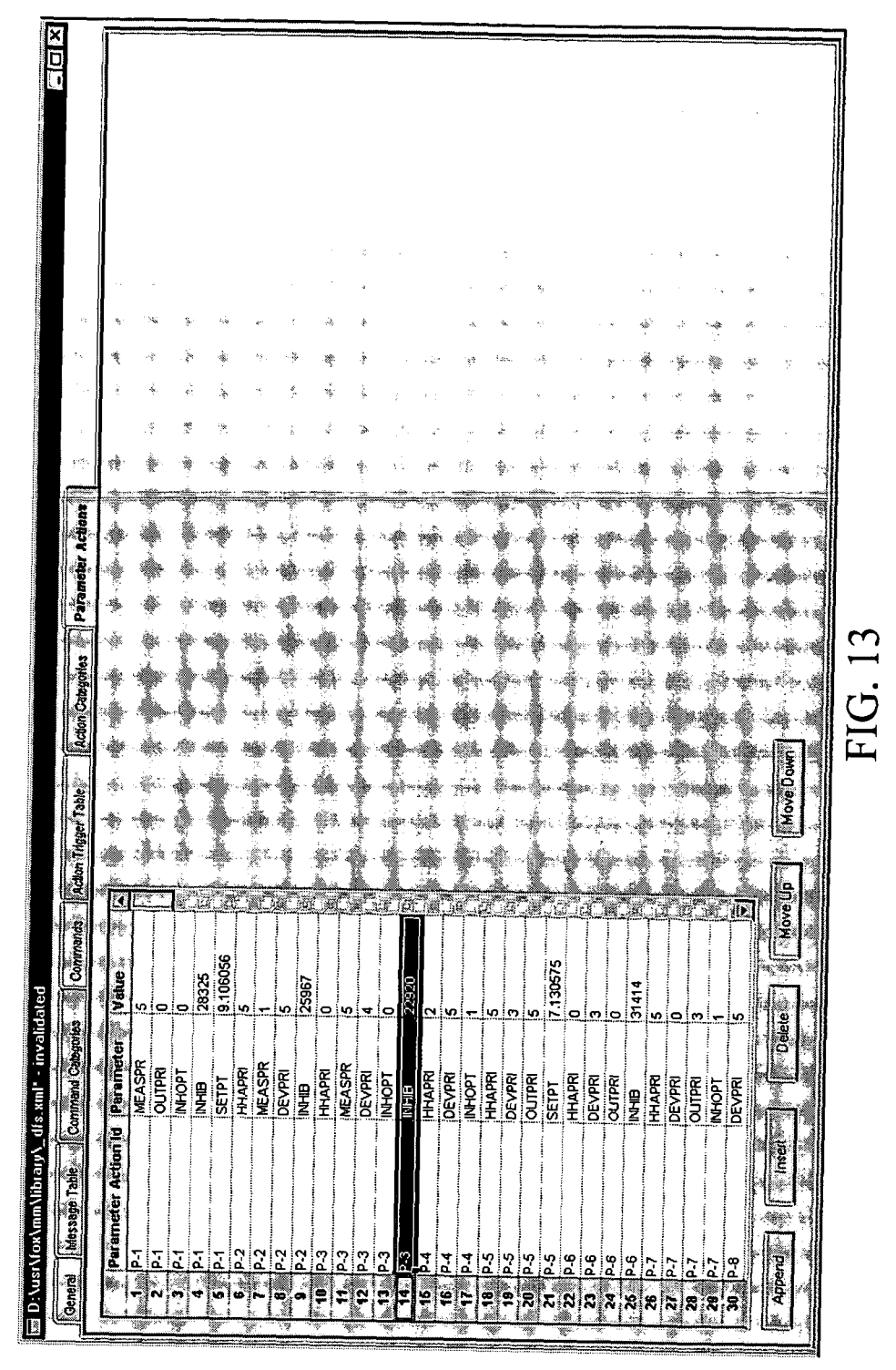

With reference to FIG. 13, an exemplary configurator graphical user interface is displayed for accessing/editing the contents of the parameter actions table 350. As explained previously above, the values of parameters associated with a particular block on one of the control processors 106 can be changed by the message management facility 100 in response to a change to the value of a mode or event variable. Setting a parameter values on the block is referred to herein as a parameter action. One use of such parameter actions is setting a new priority on an alarm parameter for a block.

A parameter action ID column of the exemplary user interface identifies parameter action IDs for parameter actions stored in the parameter actions table 350. As indicated in the illustrative example, the parameter action ID values are not unique and thus a single parameter action ID can result in changing multiple parameters on a block. A group of parameter actions invoked at a same time are assigned a same parameter action ID. During configuration, a user may write all values directly into the parameter action table cells.

In an embodiment, the configuration information described herein above is stored in the form of an XML file. At startup, the message manager 100a parses the XML file rendered by the configurator and stores resulting alarm and message management configuration information in the configuration database 204.

Figure 14:
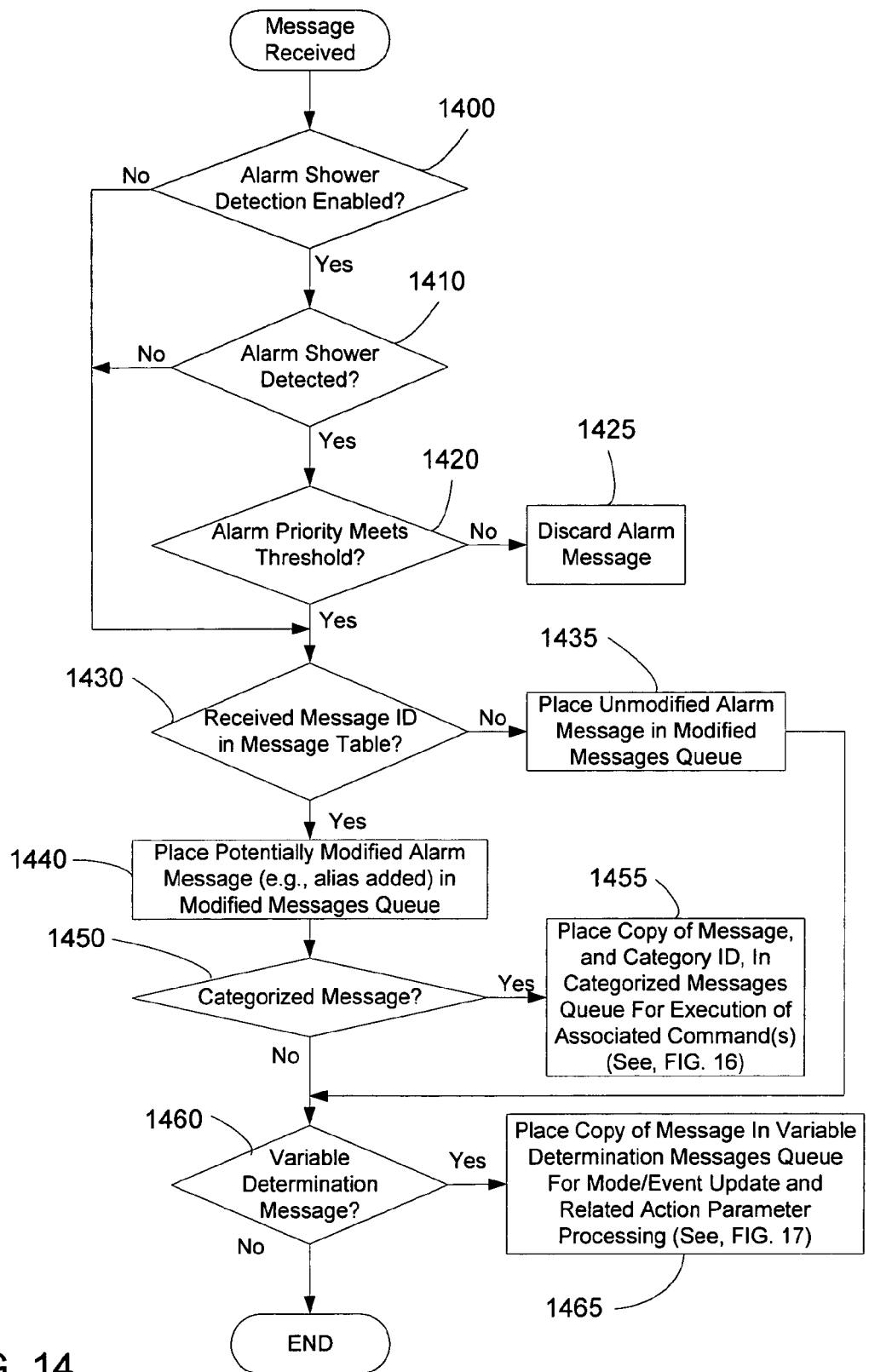
FIG. 14 is a flowchart summarizing steps associated with processing, by a message manager, a received message from the control network.

Having described the general functional components, data structures and configuration interfaces for a message management facility, attention is now directed to steps performed by the message management facility to process received messages. Turning initially to FIG. 14, a set of steps summarize the processing of received messages including alarms. In response to receiving a message, the packet receiver process 200 initially applies alarm shower detection/suppression procedures to determine whether to discard the received message (a discarded alarm message will not be passed on to its intended destination on the application network 104). In particular, at step 1400 if alarm shower detection is enabled, then control passes to step 1410 wherein an alarm shower state (i.e., detected/not detected) parameter value is determined (see, FIG. 15 for an exemplary method for determining an alarm shower state). If the alarm shower parameter indicates that an alarm shower was indeed detected, then control passes from step 1410 to step 1420. At step 1420 a priority of the received alarm message is compared to an alarm priority threshold value. If the priority of the received alarm message does not meet the alarm priority threshold value, then control passes to step 1425 wherein the alarm message is discarded instead of passing the alarm message to the intended destination (e.g., a workstation on the application network 104). However, if the priority assigned the received message exceeds the threshold priority, then control passes from step 1420 to step 1430 wherein further tests are commenced to determine which of the available message queues to place the received message. If at step 1400, alarm shower detection is disabled, then control passes directly to step 1430. Furthermore, if at step 1410 an alarm shower detected state has not been set, then control passes to step 1430.

At step 1430 the packet receiver 200 consults the message table 300 to determine whether a corresponding message entry can be found. If at step 1430 the received message's ID cannot be located in the message table 300, then control passes to step 1435 wherein the received message is placed within the modified messages queue 210 without modifications by the packet receiver 200. As previously mentioned, the device server 220 retrieves the messages from the modified messages queue 210 and passes them to one or more destinations in accordance with destinations identified in the device database 202. If, at step 1430, the received message's ID is located in the message table 300, then control passes to step 1440.

At step 1440, an alias (if provided in the entry within the message table 300) is added to the received message before adding the entry to the modified messages queue 210. Next, at step 1450 if the packet receiver 200 determines the received message is associated with a category (i.e., the corresponding entry in the message table 300 includes a category ID), then control passes to step 1455. At step 1455 an additional copy of the received message, along with its associated category ID (obtained from an entry in the message table 300), is placed in the categorized messages queue 208. Processing of an entry from the categorized messages queue 208 (described herein below with reference to FIG. 16) results in the invocation of a command/executable program by the message manager (e.g., message manager 100a). Such command/executable program can be of virtually any type. However, one example of such command results in the initiation of a voice message stream play sequence by a set of nodes on the application network 104 to provide an audible warning when a particular alarm message is received.

If the message is not associated with a category ID, then control passes from step 1450 to step 1460 (also entered from step 1435 described herein above). At step 1460 if the received message is a variable determination message (i.e., one providing notification of an event/mode change), then control passes to step 1465 wherein a copy of the received variable determination is placed in the variable determination messages queue 206 for further processing. Processing entries retrieved from the variable determination messages queue, e.g., updating alarm priorities in response to events/mode changes, is discussed further herein below with reference to FIG. 17. Finally, if the message is not a variable determination message, then control passes from step 1460 to the End.

Figure 15:
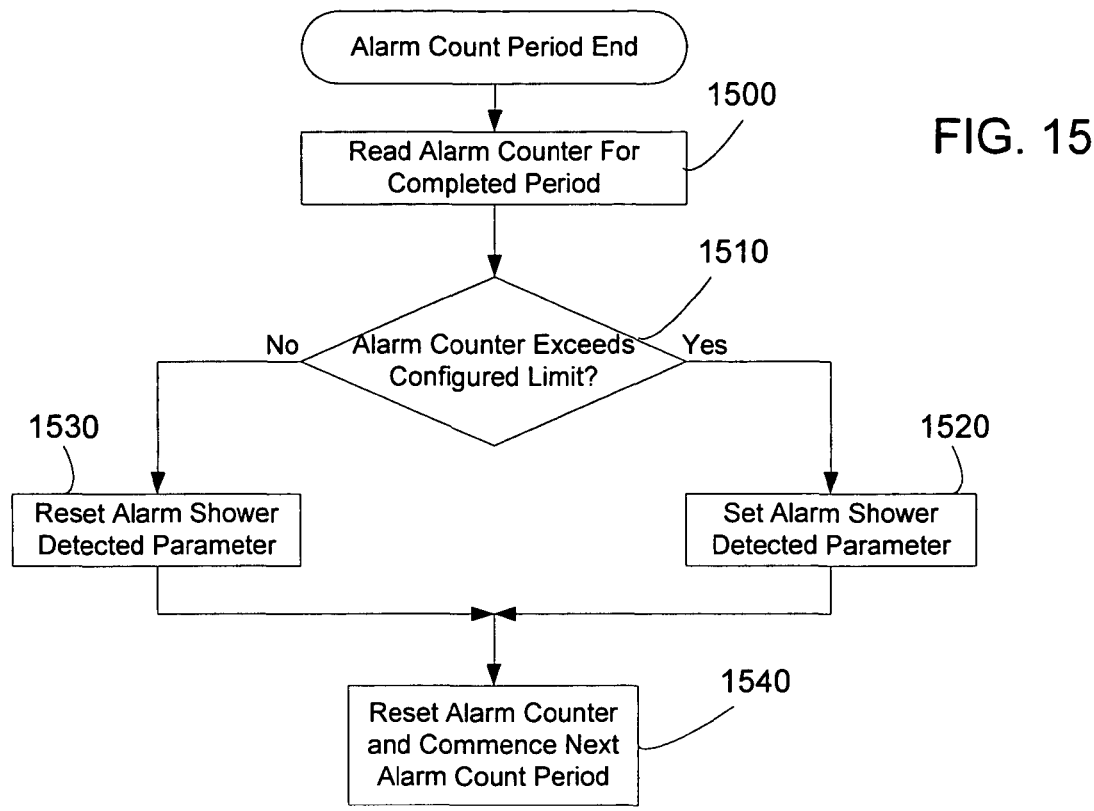
FIG. 15 is a flowchart summarizing steps associated with maintaining alarm shower status in view of configured alarm shower parameter values.

Turning to FIG. 15, a set of steps are summarized that describe an exemplary way of carrying out the alarm shower detection aspect of an exemplary message management facility. The shower detection procedure is responsible for setting an "alarm shower detected" parameter under certain circumstances. Once detected, the packet receiver discards alarm messages that do not meet a pre-set threshold priority.

The set of steps described herein below are intended to describe an exemplary way in which to detect alarm shower conditions—as well as persist an alarm shower condition parameter value once such shower conditions have been detected. Those skilled in the art will readily appreciate that there are a variety of ways in which to carry out such shower detection and persist a shower detection parameter value once a particular shower state is detected. In the exemplary method, at the end of an alarm count period (determined by the alarm period parameter discussed herein above) control passes to step 1500 wherein an alarm counter value for the just completed period is determined. Thereafter, at step 1510 if the alarm counter value exceeds a configured number of alarms (a maximum number of received alarms permitted in the alarm count period by the message manager without triggering an alarm shower condition), then control passes to step 1520 wherein the alarm shower detection parameter is set to indicate the presence of an alarm shower. As noted above in the description of FIG. 14, when the alarm shower detection parameter is set, messages with a priority lower than a currently configured threshold priority are discarded by the message manager 100a. At step 1540 the alarm counter is reset and a next alarm count period is started. Thus, the alarm shower "detected" status is maintained for at least one alarm count period once detected.

Alternatively, if the alarm counter value does not exceed the configured number of alarms, then control passes from step 1510 to step 1530. At step 1530 the alarm shower detection parameter is reset to indicate that alarm shower conditions were not present in the just completed alarm count period. Control then passes to step 1540 wherein a next alarm count period is commenced. Thus, in the exemplary embodiment, the alarm shower parameter state is based upon a just completed count period, and a current alarm shower parameter state will persist until a next count period is completed.

Figure 16:
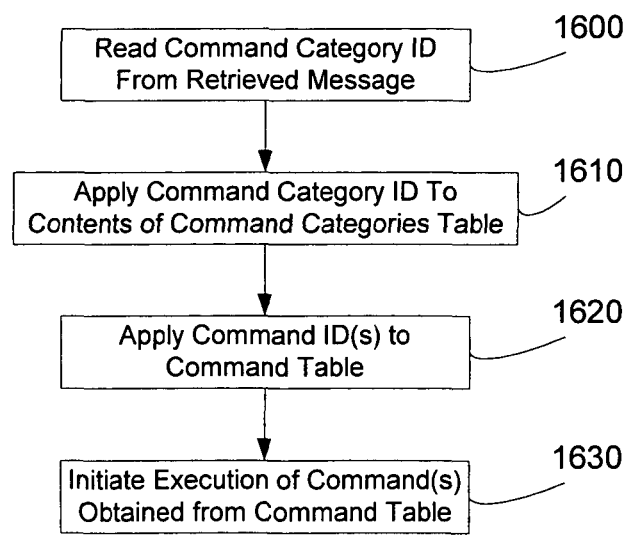
FIG. 16 is a flowchart summarizing steps associated with processing, by a message manager, a categorized message.

Turning to FIG. 16, a set of steps summarize processing a categorized message which is used to invoke one or more commands on a particular identified host (including the message manager 100a in the event that no host is specified). During step 1600 the calculation and dynamic filtering process 228 retrieves a categorized message from the categorized messages queue 208 and the associated command category ID is determined. Thereafter, at step 1610 the command category ID is applied to the contents of the command categories table 310 to identify one or more executable command IDs (see FIG. 9 for exemplary table 310 contents). Next, at step 1620 the command IDs identified during step 1610 are applied to the contents of the command table 320 (see FIG. 10 for exemplary table 320 contents). Thereafter, at step 1630 the calculation and dynamic filtering process 228 initiates execution of a command line (or any other executable command) in accordance with the contents of entries in the command table 320 corresponding to the command IDs identified during step 310. The command can be a locally executed command (on the message manager 100a) or alternatively on a host identified in the "executing host" sub-field of an entry in the commands table 320.

Figure 17:
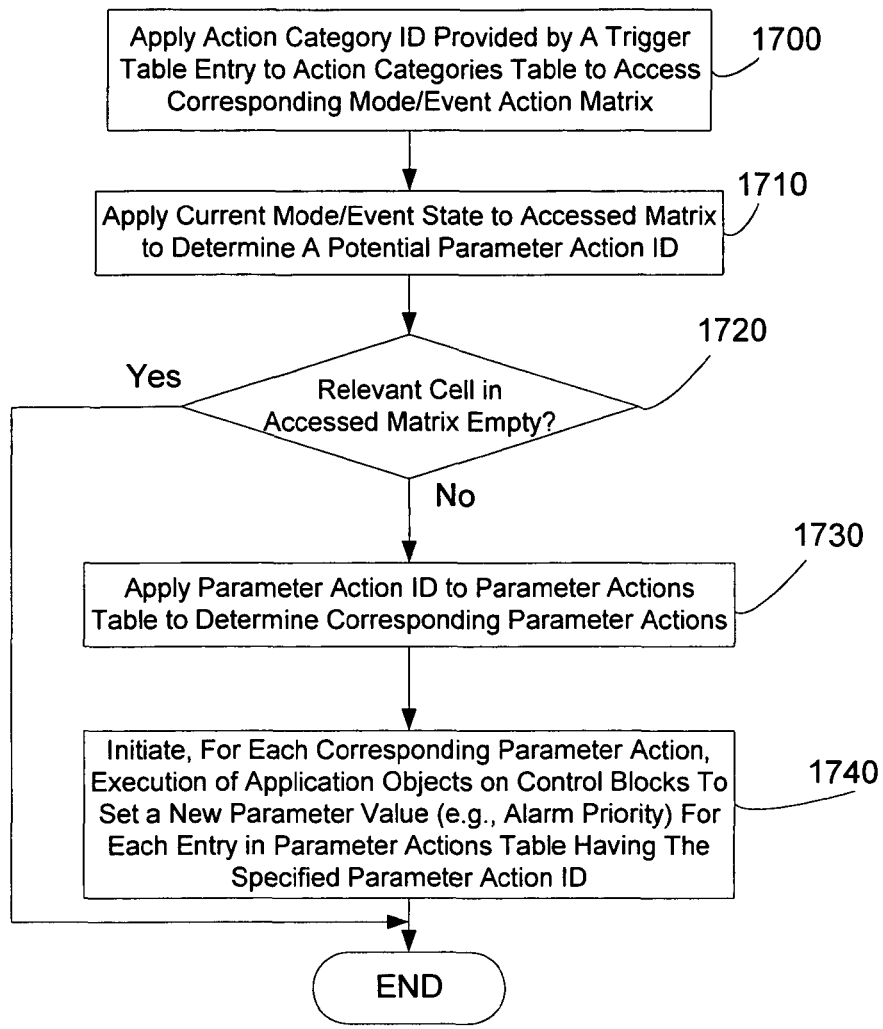
FIG. 17 is a flowchart summarizing steps associated with processing, by a message manager, an event/mode change message.

Turning to FIG. 17, a set of steps are summarized for processing messages retrieved from the variable determination messages queue 206. The calculation and dynamic filtering process 228 retrieves a variable determination message from the variable determination messages queue 206 and an event/mode change (current event/mode state) is determined. Thereafter, the steps identified in FIG. 17, are performed to apply the current event/mode state to each entry in the action triggers table 330 (see FIG. 11 for a representative set of action trigger table entries) to render and execute a set of parameter actions on corresponding compound/block/parameter combinations on the control processors 106 of the control network 102. While the present example comprises initiating changes to parameter (e.g., priority) values on identified control blocks maintained by control processors 106, this activity can be generalized to any particularized actions invoked in response to events/mode changes that render a particular event/mode state.

At step 1700, the action category ID specified for a particular entry in the action triggers table 330 is applied to the action categories table 340 to locate a particular mode/event matrix corresponding to the action category ID (see FIG. 12). Thereafter, at step 1710 the present mode/event state is applied to the particular referenced mode/event matrix to determine a parameter action ID, if any, corresponding to a cell within the referenced mode/event matrix corresponding to the present mode/event state. As mentioned above, in the case where events are not mutually exclusive, a highest priority event determines the selection of a cell in the mode/event matrix. Otherwise, the most recently registered event controls.

At step 1720, if the accessed cell in the mode/event matrix is empty, then control passes to the End. Otherwise, control passes to step 1730 wherein the parameter action ID determined during step 1710 is applied to the parameter actions table 350 (see FIG. 13) to identify one or more entries (corresponding to the parameter action ID) that specify the identified parameter action ID. Thereafter, during step 1740, the calculation and dynamic filtering process 228 initiates executing application objects specifying parameter/value combinations in accordance with the contents of entries in the parameter actions table 350 identified during step 1730. When building application objects the source of a designated compound/block is the entry in the action triggers table 330 accessed during step 1700. Upon completing processing of the particular action trigger table entry, control passes to the End.

With regard to the steps described in association with FIG. 17, it is noted that while virtually any type of parameter can be set on a control block (or similar control processor program module/structure), a particularly useful application of the ability to designate certain parameter values for certain mode/event combinations is modifying alarm priorities. Furthermore, the functionality of using mode/event changes to drive responsive parameter actions initiated by the message manager 100a can be generalized to performing any of a variety of actions, including invoking executable commands, thereby creating/supporting a dynamic process monitoring/control environment.

The structures, techniques, and benefits discussed above are merely exemplary embodiments of the invention. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Moreover, those of skill in the art will recognize that the disclosed principles are not limited to any particular local area network protocols and/or topologies. Therefore, the invention as described herein contemplates all such embodiments as may come within the scope of the following claims and equivalents thereof.

What is claimed is:

1. A message monitor within a node, in a process control network environment, separate from a control processor, the message monitor comprising:
    a message table including a set of message table entries, each entry comprising:
        a message ID, and
        a command ID;
    a message monitoring functionality for receiving a message from the control processor; and
    a command execution functionality for:
        identifying the received message as a variable definition message when the received message includes a mode variable, wherein a value of said mode variable is representative of an operation mode of the process control network environment transitioning from one mode to another mode,
        responsive to the identification of the received message as a variable definition message, updating a dynamic message priority value with the value of the mode variable of the received variable definition message to reflect the transition of the operation mode of the process control network environment,
        identifying the received message as a categorized message when an entry in the message table has a message ID corresponding to a message ID value of the received message,
        responsive to the identification of the received message as a categorized message, determining a dynamic priority value of the categorized message, re-prioritizing the categorized message by updating the dynamic priority value thereof with the updated dynamic message priority value to reflect an operation mode of the process control network environment transitioning from one mode to another mode; and responsive to the reprioritization of the categorized message, initiating execution of a command associated with the command ID, said command ID being the entry in the message table for the categorized message, wherein the message monitoring functionality and the command execution functionality each comprises software executed by one or more hardware processors.

2. The message monitor of claim 1 further comprising a device database thread for routing the message received from the control processor to one or more network destinations.

3. The message monitor of claim 2 wherein the control processor and the network destinations are located on two distinct networks, and wherein the message monitor bridges the two distinct networks.

4. The message monitor of claim 3 wherein the node comprises at least a control network interface for receiving the message from the control processor via a control network and an application network interface for transmitting the message to the one or more network destinations.

5. The message monitor of claim 2 wherein the device database thread is configured for detecting an alarm shower condition by monitoring a quantity of alarm messages received from a control network and applies thereto a criterion to limit transmitting messages to the one or more network destinations by the device database thread in response to detecting the alarm shower condition.

6. The message monitor of claim 1 wherein the command ID comprises a command category ID that corresponds to a set of executable commands identified in a corresponding entry within a command category table.

7. The message monitor of claim 6 further comprising a command table that includes a set of executable command entries referenced by entries in the command category table.

8. The message monitor of claim 7 wherein the executable command entries include an executable host field that identifies a host upon which a specified command is executed.

9. The message monitor of claim 1 wherein the received message comprises an alarm message issued by the control processor.

10. A method of prioritizing messages in a process control network environment, comprising:
defining, in a matrix within a message management facility of the process control network environment, a plurality of priority values for messages associated with an alarm of the process control network environment, the matrix comprising mutually exclusive operation modes of the process control network environment;
receiving, by a message receiver of the message management facility, a message associated with the alarm from a control processor, wherein the control processor is separate from the process control network environment, and wherein the message receiver comprises software executed by one or more hardware processors;
identifying, by the message management facility, the received message as a variable definition message when the received message includes a mode variable, wherein a value of said mode variable is representative of the process control network environment transitioning from one of the mutually exclusive operation modes to another of the mutually exclusive operation modes;
adjusting, by the message management facility in response to the identification of the received message as a variable definition message, at least one of the plurality of priority values dynamically in response to the transition of the operation mode of the process control network environment;
identifying, by the message management facility, the received message as a categorized message when the received message includes a message ID value corresponding to a message ID entry in a message table of the message management facility;
assigning, by the message management facility, the dynamically adjusted priority value to the categorized message; and
executing, by the message management facility, a command associated with a command ID of the categorized message in response to said assigning.

11. The method of claim 10 further comprising routing, by a device database thread, the received message to one or more network destination.

12. The method of claim 11 wherein the control processor and the network destinations are located on two distinct networks, and wherein the message management facility bridges the two distinct networks.

13. The method of claim 12 wherein the message management facility operates on a networked node comprising at least a control network interface for receiving messages from the control processor via a control network and an application network interface for transmitting messages to the network destinations.

14. The method of claim 11 further comprising:
detecting an alarm shower condition by monitoring a quantity of alarm messages received from the control processor via a control network; and
applying to the received messages a criterion to limit transmitting messages to the network destinations in response to detecting the alarm shower condition.

15. The method of claim 10 wherein the command ID comprises a command category ID that corresponds to a set of executable commands identified in a corresponding entry within a command category table.

16. The method of claim 15 further comprising defining a command table that includes a set of executable command entries referenced by entries in the command category table.

17. The method of claim 16 further comprising identifying, by an executable host field of the executable command entries, a host upon which a specified command is executed.

* * * * *